United States Patent
Nakano

(10) Patent No.: US 11,015,835 B2
(45) Date of Patent: May 25, 2021

(54) MANAGEMENT DEVICE, DISPLAY SWITCH SYSTEM, AND AIR-CONDITIONING SYSTEM

(71) Applicant: Mitsubishi Electric Corporation, Tokyo (JP)

(72) Inventor: Tomoo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 123 days.

(21) Appl. No.: 16/466,912

(22) PCT Filed: Feb. 7, 2018

(86) PCT No.: PCT/JP2018/004189
§ 371 (c)(1),
(2) Date: Jun. 5, 2019

(87) PCT Pub. No.: WO2018/147319
PCT Pub. Date: Aug. 16, 2018

(65) Prior Publication Data
US 2020/0064011 A1 Feb. 27, 2020

(30) Foreign Application Priority Data
Feb. 8, 2017 (WO) .................. PCT/JP2017/004520

(51) Int. Cl.
*F24F 11/89* (2018.01)
*G06F 3/147* (2006.01)
(Continued)

(52) U.S. Cl.
CPC .............. *F24F 11/89* (2018.01); *F24F 11/52* (2018.01); *F24F 11/56* (2018.01); *G06F 3/147* (2013.01)

(58) Field of Classification Search
CPC . G06F 40/42; G06F 40/47; F24F 11/52; F24F 11/56; F24F 11/89
See application file for complete search history.

(56) References Cited

U.S. PATENT DOCUMENTS 9,940,605 B2* 4/2018 St. Clair ................. H04L 67/22
2014/0351268 A1* 11/2014 Weskamp ......... G06F 16/24578
707/748

(Continued)

FOREIGN PATENT DOCUMENTS

| JP | 2006-046686 A | 2/2006 |
|---|---|---|
| JP | 2013-125047 A | 6/2013 |

(Continued)

OTHER PUBLICATIONS

International Search Report of the International Searching Authority dated May 15, 2018 for the corresponding international application No. PCT/JP2018/004189 (and English translation).

Primary Examiner — Todd Buttram
(74) Attorney, Agent, or Firm — Posz Law Group, PLC

(57) ABSTRACT

A management device is connected to an apparatus and is configured to manage the apparatus. The management device includes a display unit, a wireless communication unit, and a control unit. The display unit is configured to display information about the apparatus. The wireless communication unit is configured to wirelessly communicate with a mobile terminal. The control unit is configured to, when a distance between the management device and the mobile terminal is shorter than a threshold, adjust display settings of the display unit to display settings of the mobile terminal.

19 Claims, 14 Drawing Sheets

(51) Int. Cl.
*F24F 11/56* (2018.01)
*F24F 11/52* (2018.01)

(56) References Cited

U.S. PATENT DOCUMENTS

2017/0122618 A1    5/2017  Yamamoto et al.
2018/0218525 A1*   8/2018  Jagerson, Jr. .......... G06Q 10/00

FOREIGN PATENT DOCUMENTS

| | | |
|---|---|---|
| JP | 2014-003391 A | 1/2014 |
| JP | 2015-129638 A | 7/2015 |
| WO | 2015/190359 A1 | 12/2015 |

* cited by examiner

MANAGEMENT DEVICE, DISPLAY SWITCH SYSTEM, AND AIR-CONDITIONING SYSTEM

CROSS REFERENCE TO RELATED APPLICATION

This application is a U.S. national stage application of International Application No. PCT/JP2018/004189, filed on Feb. 7, 2018, which claims priority to International Application No. PCT/JP2017/004520, filed on Feb. 8, 2017, the contents of which are incorporated herein by reference.

TECHNICAL FIELD

The present invention relates to a management device that manages an apparatus, such as an air-conditioning apparatus, and also to a display switch system and an air-conditioning system.

BACKGROUND

Management devices, such as remote control units that manage apparatuses, can be used by any number of people, and ease of use considerably decreases if users are not conversant with languages that are displayed on the management devices. For this reason, management devices that are provided at, for example, locations such as hotels where people of various nationalities stay or multi-national corporations are required for the function of switching display settings for languages that are used by users. Management devices that are provided at locations such as homes for the elderly where there are many elderly people are required for the function of increasing the text size as compared to that of a default setting.

In such situations, some existing management devices are able to change display settings of their display units (see, for example, Patent Literature 1). The management device of Patent Literature 1 previously stores text data for multiple languages and switches the languages of text displayed in response to an input operation made by a user.

PATENT LITERATURE

Patent Literature 1: Japanese Unexamined Patent Application Publication No. 2006-046686

However, the existing management devices as described in Patent Literature 1 require users to manually change the set language, the set size of text, or other settings while consulting, for example, an instruction manual. Such a change of settings requires a complicated operation and requires time. In particular, when languages with which users are unfamiliar are used as default languages of management devices, an operation to change the display settings becomes further difficult. In addition, the existing management devices are not able to handle conversion into languages not stored in the management devices. The management devices also have a tendency to display a larger amount of information on one screen by reducing the size of text so that miscellaneous settings can be performed on a setup screen. For this reason, for elderly users, text is hard to read and display settings are very difficult to change.

SUMMARY

The present invention is made to solve such inconvenience, and it is an object of the present invention to provide a management device, display switch system, and air-conditioning system that easily and quickly perform a process of switching display A management device according to an embodiment of the present invention is connected to an apparatus and is configured to manage the apparatus. The management device includes a display unit, a wireless communication unit, and a control unit. The display unit is configured to display information about the apparatus. The wireless communication unit is configured to wirelessly communicate with a mobile terminal. The control unit is configured to, when a distance between the management device and the mobile terminal is shorter than a threshold, adjust display settings of the display unit to display settings of the mobile terminal.

A display switch system according to an embodiment of the present invention includes the management device and a mobile terminal. The mobile terminal includes a terminal display unit and a terminal control unit. The terminal display unit is configured to display a page for operating an apparatus. The terminal control unit is configured to control a status of display on the terminal display unit. The terminal control unit is configured to, when a status of display on the display unit of the management device is changed, change the status of display on the terminal display unit into the changed status of display on the display unit.

An air-conditioning system according to an embodiment of the present invention includes the management device and an air-conditioning apparatus. The air-conditioning apparatus is connected to the management device and is configured to air-condition a room.

According to an embodiment of the present invention, when the distance between the management device and the mobile terminal is shorter than the threshold, the display settings of the display unit are adjusted to the display settings of the mobile terminal, so the display settings of the display unit are automatically adapted to the preference of a user. Consequently, a process of switching the display settings of the management device into various display settings is easily and quickly performed.

DETAILED DESCRIPTION

Embodiment 1

Figure 1:
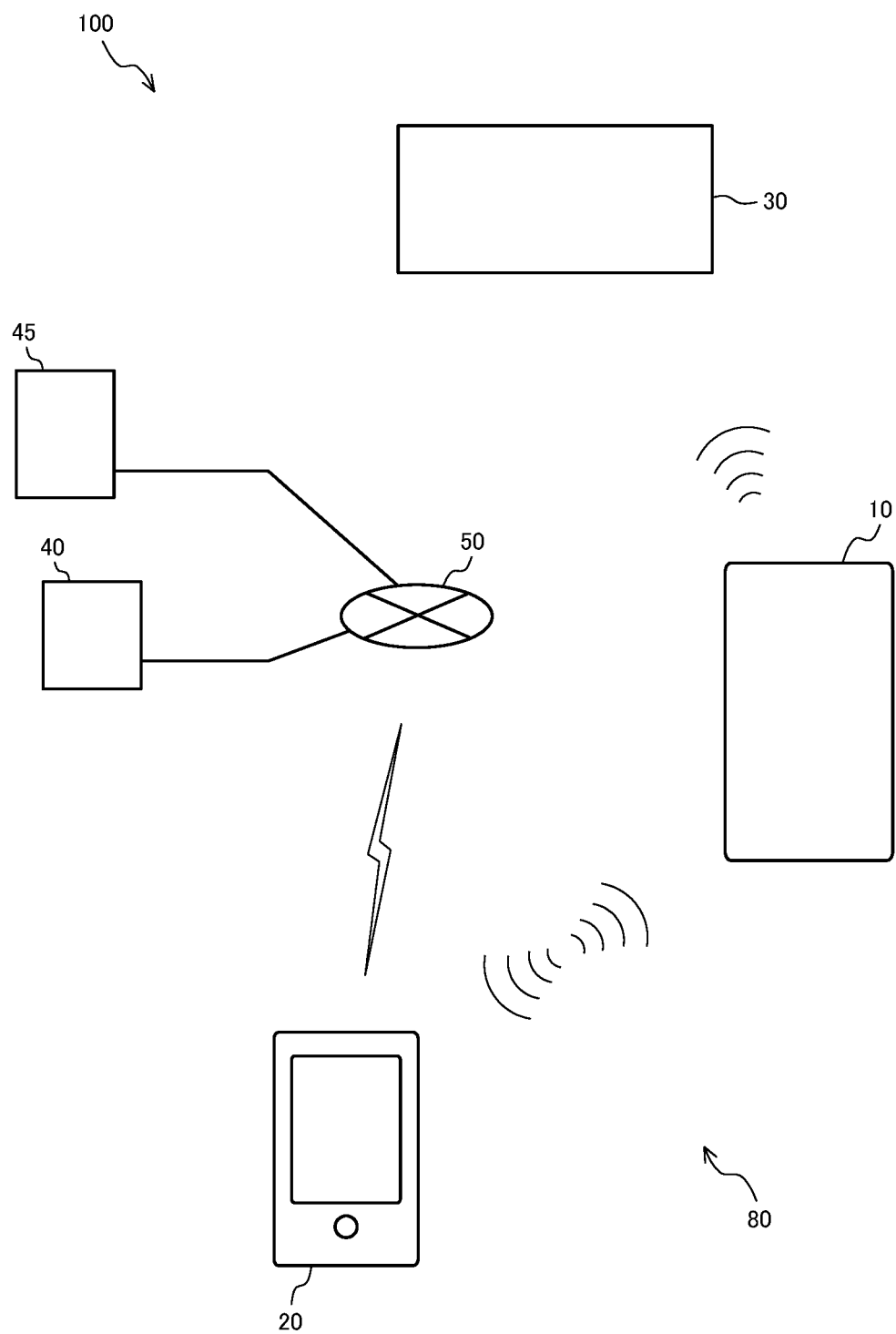
FIG. 1 is a schematic diagram showing the configuration of an apparatus management system according to Embodiment 1 of the present invention.

FIG. 1 is a schematic diagram showing the configuration of an apparatus management system according to Embodiment 1 of the present invention. As shown in FIG. 1, the apparatus management system 100 includes a display switch system 80, an apparatus 30, a program management server 40, and an external server 45. The display switch system 80 includes a management device 10 and a mobile terminal 20.

The management device 10 is connected to the apparatus 30 by wired or wireless connection, and manages the apparatus 30. That is, the management device 10 is a remote control unit that a user operates to manage the apparatus 30. The management device 10 is disposed on, for example, a wall surface or other locations of a room. When the management device 10 is connected to the apparatus 30 by wireless connection, a user is allowed to use the management device 10 within the region in which the management device 10 is wirelessly communicable with the apparatus 30.

The apparatus 30 is operated via the management device 10. Examples of the apparatus 30 include an air-conditioning apparatus, a water heater, floor heating, a television, a digital television, a DVD recorder, a stereo, a car navigation system, and a lighting apparatus. The apparatus 30 corresponds to the apparatus of the present invention.

The program management server 40 stores and manages an information generating program for causing the mobile terminal 20 to execute a process of generating display setting information representing display settings. The information generating program is a program for the mobile terminal 20 to implement a process of switching the display settings of the management device 10 in cooperation with the management device 10. That is, the information generating program is a dedicated application that provides the mobile terminal 20 with the function of generating display setting information in response to a request from the management device 10 and transmitting the generated display setting information to the management device 10. The external server 45 generates translation data by translating text information that is transmitted from the management device 10 and returns the generated translation data to the management device 10.

The mobile terminal 20 is a terminal that a user can carry. Examples of the mobile terminal 20 include a cellular phone, a smartphone, a tablet personal computer (PC), a notebook PC, and a personal digital assistant (PDA). The mobile terminal 20 has a function of communicating information by using selected communication standards. Examples of the communication standards include Bluetooth (registered trademark, hereinafter, the same applies), a wireless LAN, such as Wi-Fi (registered trademark, hereinafter, the same applies), and ZigBee (registered trademark, hereinafter, the same applies). Herein, Bluetooth includes Bluetooth Low Energy (BLE).

The mobile terminal 20 has a function of downloading and installing the information generating program from the program management server 40 via a network 50. When the information generating program is installed in the mobile terminal 20, the mobile terminal 20 is able to adjust the display settings of the management device 10 in cooperation with the management device 10. Installation of the information generating program into the mobile terminal 20 may be performed by an owner of the mobile terminal 20 or by an employee or other persons at the location for the owner, for example, at the time of checking into a hotel, at the time of moving into a home for the elderly, at the time of going into an internet cafe, or at another time. Alternatively, installation of the information generating program into the mobile terminal 20 may be performed in advance at home or at another location.

Figure 2:
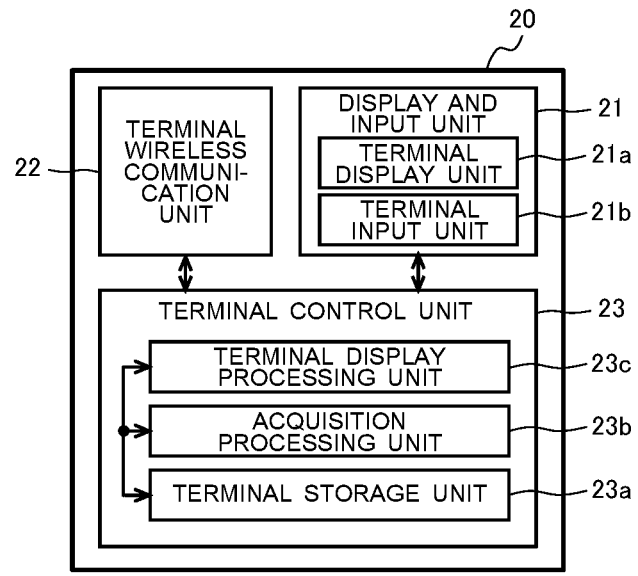
FIG. 2 is a block diagram showing the functional configuration of a mobile terminal of FIG. 1.

FIG. 2 is a block diagram showing the functional configuration of the mobile terminal of FIG. 1. As shown in FIG. 2, the mobile terminal 20 includes a display and input unit 21, a terminal wireless communication unit 22, and a terminal control unit 23.

The display and input unit 21 is a touch panel made up of a terminal display unit 21a and a terminal input unit 21b laminated on top of each other. The terminal display unit 21a is, for example, a liquid crystal panel. The terminal display unit 21a displays, for example, text or an image. The terminal input unit 21b accepts an input operation made by a user. More specifically, the terminal input unit 21b detects a location touched by a user and outputs information about the detected location to the terminal control unit 23.

The terminal wireless communication unit 22 communicates with the management device 10. The terminal wireless communication unit 22 also communicates with the program management server 40 via the network 50. Furthermore, when a display control unit 15 communicates with the external server 45 via the mobile terminal 20, the terminal wireless communication unit 22 relays communication between the display control unit 15 and the external server 45.

The terminal control unit 23 includes a terminal storage unit 23a, an acquisition processing unit 23b, and a terminal display processing unit 23c. Not only various data but also an operating program for the terminal control unit 23, such as the information generating program, is stored in the terminal storage unit 23a. The acquisition processing unit 23b downloads and installs the information generating program from the program management server 40 in response to an input operation made by a user or another person. The acquisition processing unit 23b generates and transmits display setting information representing the display settings of the mobile terminal 20 in accordance with the installed information generating program. The terminal display processing unit 23c displays, for example, text and an image on the terminal display unit 21a or changes display contents on the terminal display unit 21a in response to an input operation made by a user or another person.

Figure 3:
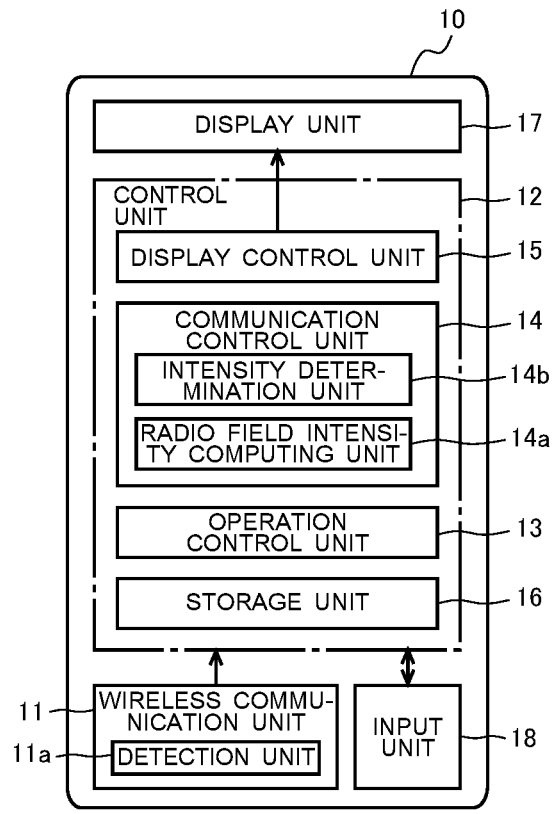
FIG. 3 is a block diagram showing the functional configuration of a management device of FIG. 1.

FIG. 3 is a block diagram showing the functional configuration of the management device 10 of FIG. 1. As shown in FIG. 3, the management device 10 includes a wireless communication unit 11, a control unit 12, a display unit 17, and an input unit 18.

The wireless communication unit 11 wirelessly communicates with the mobile terminal 20. The wireless communication unit 11 includes a detection unit 11a that detects a wireless signal transmitted by the mobile terminal 20. The detection unit 11a has a proximity communication function of establishing proximity communication. The detection unit 11a detects a radio wave from the mobile terminal 20 as a wireless signal with the use of the proximity communication function. In Embodiment 1, the wireless communication unit 11 is configured to detect a radio wave of the mobile terminal 20 at set time intervals. A radio wave of the mobile terminal 20 is a radio wave that the mobile terminal 20 emits when the proximity communication function is enabled. The proximity communication function is, for example, a function of establishing communication by using Bluetooth, wireless LAN, or other wireless communication standards. Hereinafter, a radio wave of the mobile terminal 20 is also simply referred to as radio wave.

The display unit 17 is, for example, a liquid crystal display (LCD). The display unit 17 displays information about the apparatus 30. The information about the apparatus 30 includes not only information about an operation over the apparatus 30 but also information representing the status of the apparatus 30 or other information. The input unit 18 receives an input operation made by a user, and transmits an operation signal representing the details of the input operation to the control unit 12. The input unit 18 is, for example, made up of a plurality of physical buttons.

The control unit 12 includes an operation control unit 13, a communication control unit 14, the display control unit 15, and a storage unit 16. Not only various data such as a first threshold and a second threshold (described later) but also, for example, an operating program for the control unit 12 is stored in the storage unit 16. The operation control unit 13 controls the operation of the apparatus 30. For example, when the operation control unit 13 receives an operation signal representing details set by a user from the input unit 18, the operation control unit 13 controls the operational status of the apparatus 30 on the basis of the received operation signal. When the operation control unit 13 receives an operation signal representing a stop of operation or a start of operation from the input unit 18, the operation control unit 13 stops or starts the operation of the apparatus 30.

The communication control unit 14 searches for the mobile terminal 20 whose proximity communication function is enabled, on the basis of a radio wave detected by the wireless communication unit 11. The communication control unit 14 includes a radio field intensity computing unit 14a and an intensity determination unit 14b. The radio field intensity computing unit 14a finds the average of the radio waves of the same mobile terminal 20, detected by the wireless communication unit 11 within a set period of time, as a radio field intensity. The set period of time is set to a period of time longer than the interval at which the wireless communication unit 11 detects a radio wave. The wireless communication unit 11 detects the radio wave of the same mobile terminal 20 multiple times within the set period of time. Of course, the radio field intensity computing unit 14a may determine the value of one radio wave detected by the wireless communication unit 11 as a radio field intensity.

The radio field intensity computing unit 14a also has a function of, at the timing at which the wireless communication unit 11 detects the radio wave of the mobile terminal 20, determining whether the wireless communication unit 11 detects the radio wave of the mobile terminal 20. The radio field intensity computing unit 14a has a function of, when the wireless communication unit 11 does not detect the radio wave of the mobile terminal 20, outputting a no-wave signal representing that no radio wave is detected to the intensity determination unit 14b.

The intensity determination unit 14b determines whether a radio field intensity found by the radio field intensity computing unit 14a is greater than or equal to the first threshold. The distance between a location at which the management device 10 is installed and a location that is a reference to set the first threshold corresponds to the threshold of the present invention. That is, the intensity determination unit 14b determines whether the distance between the management device 10 and the mobile terminal 20 is shorter than the threshold.

The first threshold is set for the size, layout, and other factors, of a room in which the apparatus 30 is installed. More specifically, the first threshold is set with reference to, for example, a location where a user spends a lot of time in space in which the apparatus 30 is installed. The location where a user spends a lot of time is conceivably a bed provided in a room of a hotel or other accommodations, a table or a sofa in a meeting room, or another location.

That is, when the radio field intensity is greater than or equal to the first threshold, it is determined that the distance between the management device 10 and the mobile terminal 20 is shorter than the threshold. Consequently, when the radio field intensity is greater than or equal to the first threshold, the intensity determination unit 14b provides a switching command to the display control unit 15. The switching command that the intensity determination unit 14b provides is a signal to provide an instruction to switch the display settings of the display unit 17.

Incidentally, even when the radio field intensity once becomes greater than or equal to the first threshold and then temporarily becomes less than the first threshold, a user of the mobile terminal 20 possibly continuously operate the management device 10. For example, it is conceivable that the apparatus 30 and the management device 10 are provided in a room of a hotel or other accommodations, and a user moves into a bathroom with the mobile terminal 20 in a situation that the radio field intensity of the mobile terminal 20 in the bathroom is less than the first threshold.

The intensity determination unit 14b is configured to, after providing the switching command, when the radio field intensity found by the radio field intensity computing unit 14a is less than the second threshold or when a no-wave signal is output from the radio field intensity computing unit 14a, provide a restoration command to the display control unit 15. The second threshold is set for the size, layout, and other factors, of the room in which the apparatus 30 is installed, and is set to be less than the first threshold. That is, the intensity determination unit 14b determines whether the mobile terminal 20 moves away by determining whether the radio field intensity found by the radio field intensity computing unit 14a is less than the second threshold.

The restoration command that the intensity determination unit 14b provides is a signal to provide an instruction to restore the display settings of the display unit 17, that is, to return the display settings to default display settings. The default display settings include not only initial display settings but also display settings customized by a person in charge of the apparatus 30 or other persons.

The display control unit 15 switches the display settings of the display unit 17 to the display settings of the mobile terminal 20 in accordance with the display setting information. In Embodiment 1, the display setting information is information representing the language setting and setting of text size of the mobile terminal 20. That is, the display control unit 15 switches the language settings and settings of the text size of the display unit 17 to those of the mobile terminal 20 in such a manner that the display settings are equivalent to the display settings represented by the display setting information. Hereinafter, the setting of the text size is also referred to as text size setting.

When the display control unit 15 receives the switching command from the intensity determination unit 14b, the display control unit 15 makes a request of the mobile terminal 20 to generate and transmit the display setting information via the wireless communication unit 11, and acquires the display setting information that is transmitted from the mobile terminal 20 upon request. The display control unit 15 also determines whether the language setting represented by the display setting information coincides with the default language setting. Furthermore, the display control unit 15 determines whether the text size setting represented by the display setting information coincides with the default text size setting. The display control unit 15 adjusts the display settings on the basis of the results of the determinations, and causes the display unit 17 to display, for example, text in accordance with the adjusted display settings.

That is, when the language setting represented by the display setting information coincides with the default language setting, the display control unit 15 does not change the language setting of text to be displayed on the display unit 17. On the other hand, when the language setting represented by the display setting information does not coincide with the default language setting, the display control unit 15 changes the language setting of text to be displayed on the display unit 17. More specifically, when the language setting represented by the display setting information does not coincide with the default language setting, the display control unit 15 transmits text information to be displayed on the display unit 17 to the external server 45 and causes the external server 45 to translate the information. The display control unit 15 may directly establish data communication with the external server 45 or may establish data communication with the external server 45 via the mobile terminal 20.

When the text size setting represented by the display setting information is the same as the default text size setting, the display control unit 15 does not change the text size setting of text to be displayed on the display unit 17. On the other hand, when the text size setting represented by the display setting information is different from the default text size setting, the display control unit 15 changes the text size setting of text to be displayed on the display unit 17 to the display settings of the mobile terminal 20 in accordance with the display setting information. When the display control unit 15 is not able to change the text size setting of the display unit 17 to the same as the text size setting of the mobile terminal 20, the display control unit 15 may cause the display unit 17 to reduce or increase the size of part or all of text and causes the display unit 17 to display the text. A priority may be set in advance for each of pieces of information to be displayed on the display unit 17, and the display unit 17 may be caused to display information excluding part or all of the information having a low priority.

The display control unit 15 adjusts the language and size of text in accordance with the display setting information and causes the display unit 17 to display the text. That is, when the display control unit 15 changes the display settings, the display control unit 15 causes the display unit 17 to display text in accordance with the changed display settings. For example, when the settings of the language and size of text, represented by the display setting information, both are different from the default settings of the language and size of text, the display control unit 15 changes the size of text of translation data returned from the external server 45 and causes the display unit 17 to display the text. When the settings of the language and size of text, represented by the display setting information, both are the same as the settings of the default language and size of text, the display control unit 15 causes the display unit 17 to display the text without changing the language and size of the text.

Figure 4:
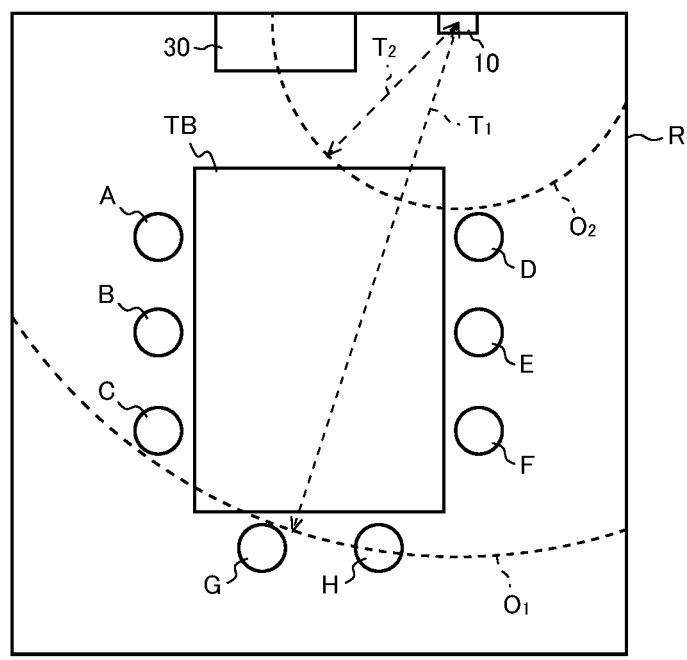
FIG. 4 is an illustrative diagram illustrating a situation that there is a plurality of users each carrying the mobile terminal in a room in which an apparatus of FIG. 1 is provided.

FIG. 4 is an illustrative diagram illustrating a situation that there is a plurality of users each carrying the mobile terminal 20 in a room in which the apparatus 30 of FIG. 1 is provided. FIG. 4 illustrates the case where there are the mobile terminals 20 of persons A to F and H at locations closer to the management device 10 than a location $O_1$ that is a reference to set the first threshold in a room R in which the apparatus 30 and the management device 10 are provided. That is, in the example of FIG. 4, the distances between the management device 10 and the mobile terminals 20 of the persons A to F and H are each shorter than a threshold $T_1$ that is a distance from the location of the management device 10 to the location $O_1$. The distance between the management device 10 and the mobile terminal 20 of the person G is longer than the threshold $T_1$. The persons A to H are seated on chairs (not shown) arranged around a table TB.

The wireless communication unit 11 has a function of, when there is a plurality of users each carrying the mobile terminal 20 of which the proximity communication function is enabled in a room or location where the management device 10 is installed, individually detecting the radio waves of the mobile terminals 20. The radio field intensity computing unit 14a has a function of, when the wireless communication unit 11 detects the radio waves of the mobile terminals 20, identifying the detected radio waves in association with the mobile terminals 20 and finding the radio field intensities of the mobile terminals 20.

The intensity determination unit 14b has a function of, when the radio field intensity associated with any one of the mobile terminals 20 is greater than or equal to the first threshold, providing the display control unit 15 with a switching command to switch the display settings of the management device 10 into the display settings of the mobile terminal 20 whose radio field intensity is greater than or equal to the first threshold. The intensity determination unit 14b also has a function of, when the radio field intensities associated with two or more of the mobile terminals 20 are each greater than or equal to the first threshold, selecting the mobile terminal 20 whose radio field intensity is the greatest.

Consequently, in the example of FIG. 4, the wireless communication unit 11 detects the radio wave of the mobile terminal 20 of each of the persons A to H. The radio field intensity computing unit 14a identifies the radio waves detected by the wireless communication unit 11 in association with the respective mobile terminals 20 and finds the radio field intensities of the respective mobile terminals 20. The intensity determination unit 14b determines that the radio field intensities of the mobile terminals 20 of the persons A to F and H are each greater than or equal to the first threshold, and determines that the radio field intensity of the mobile terminal 20 of the person G is less than the first threshold.

Furthermore, the intensity determination unit 14b compares the radio field intensities of the mobile terminals 20, determined to be greater than or equal to the first threshold, and selects the mobile terminal 20 whose radio field intensity is the greatest. The intensity determination unit 14b provides the display control unit 15 with a switching command to switch the display settings of the management device 10 into the display settings of the mobile terminal 20 whose radio field intensity is the greatest. In the example of FIG. 4, the intensity determination unit 14b selects the mobile terminal 20 of the person D who is the closest to the management device 10, and provides the display control unit 15 with a switching command to switch the display settings of the management device 10 into the display settings of the mobile terminal 20 of the person D.

Incidentally, in the above description with reference to FIG. 4, the case is described where the persons do not move; however, actually, each person is free to move. For this reason, when the mobile terminal 20 is selected on the basis of only the radio field intensity, the communication control unit 14 provides a different switching command to the display control unit 15 each time the person closest to the management device 10 switches. Consequently, the display settings of the management device 10 can be switched in contradiction to the intentions of the persons. For example, when a person who has merely passed in front of the management device 10 carries the mobile terminal 20 of which the proximity communication function is enabled, the display settings of the management device 10 are temporarily switched to the display settings of that mobile terminal 20. Consequently, the process of the control unit 12 is complicated, and the convenience of a user is impaired.

For this reason, the first threshold may be set to a relatively small value so that the distances between the persons and the management device 10 are not shorter than the threshold as much as possible. With reference to FIG. 4, for example, the first threshold may be set in such a manner that the location that is a reference to set the first threshold is a location $O_2$ and the communication control unit 14 may be configured not to provide a switching command unless the distances between the persons and the management device 10 are each shorter than a threshold $T_2$. In a scene such as meeting, when there is a person who talks close to the management device 10 and the person who talks close to the management device 10 switches, the first threshold is preferably set to a much smaller value.

Of course, the management device 10 may detect the radio wave of the mobile terminal 20 by establishing near-field wireless communication with the mobile terminal 20. Near-field wireless communication is, for example, near field communication (NFC), and is based on short-distance wireless communication standards for a communication distance of about 10 cm or shorter, typically, ISO/IEC 14443, ISO/IEC 15693, and other standards. In this case, when a person who operates the management device 10 by putting the mobile terminal 20 over the wireless communication unit 11 of the management device 10, the wireless communication unit 11 detects the radio wave, and the communication control unit 14 provides a switching command to the display control unit 15 on the basis of the radio wave detected by the wireless communication unit 11. For example, when the management device 10 is installed in a room of a hotel, a guest is prompted to put the mobile terminal 20 over the management device 10 by informing the guest of the above-described function at a reception desk or preparing a guide to use the function in the room of the hotel or other accommodations.

The control unit 12 and the terminal control unit 23 each may be hardware such as circuit devices that implement the above-described functions or may be software that is executed on an arithmetic unit, such as a microcomputer, a digital signal processor (DSP), and a central processing unit (CPU). The storage unit 16 and the terminal storage unit 23a each may be a random access memory (RAM) and a read only memory (ROM), a programmable ROM (PROM) such as a flash memory, a hard disk drive (HDD), or other storage devices.

Figure 5:
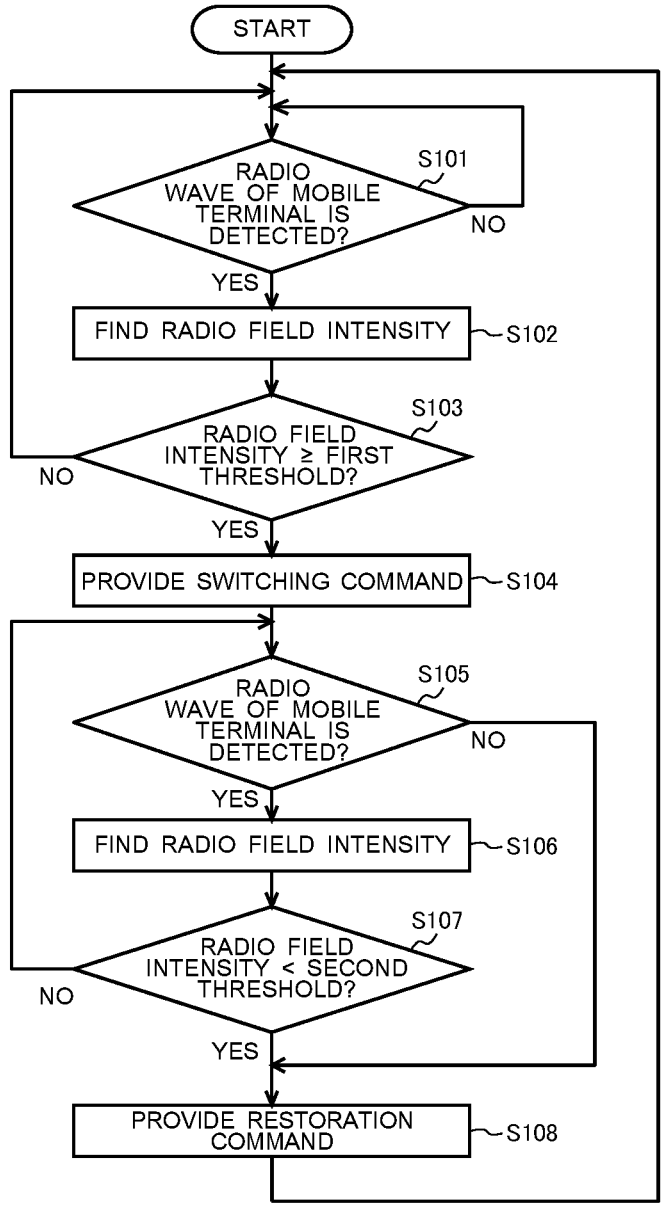
FIG. 5 is a flowchart showing the operation of a communication control unit when the management device of FIG. 1 detects one mobile terminal.

FIG. 5 is a flowchart showing the operation of the communication control unit 14 when the management device 10 of FIG. 1 detects one mobile terminal 20. The details of process that is executed by the communication control unit 14 in a situation that one mobile terminal enters or leaves a room in which the management device 10 is provided will be described with reference to FIG. 5. The following description of the operation will be made of the case where the information generating program is installed in the mobile terminal 20.

The communication control unit 14 is on standby until the wireless communication unit 11 detects the radio wave of the mobile terminal 20 (NO in step S101). When the wireless communication unit 11 detects the radio wave of the mobile terminal 20 (YES in step S101), the wireless communication unit 11 outputs information about the detected radio wave to the communication control unit 14. The communication control unit 14 finds the radio field intensity of the mobile terminal 20 on the basis of the information about the radio wave, output from the wireless communication unit 11 (step S102).

Subsequently, the communication control unit 14 determines whether the found radio field intensity is greater than or equal to the first threshold (step S103). When the radio field intensity is less than the first threshold (NO in step S103), the communication control unit 14 returns to step S101 without executing any process. On the other hand, when the radio field intensity is greater than or equal to the first threshold (YES in step S103), the communication control unit 14 determines that the mobile terminal 20 of which the proximity communication function is enabled is close to the management device 10, so the communication control unit 14 provides a switching command to the display control unit 15 (step S104).

Subsequently, at the timing at which the wireless communication unit 11 detects a radio wave of the mobile terminal 20 next time, the communication control unit 14 determines whether the wireless communication unit 11 detects the radio wave of the mobile terminal 20. That is, at the time when a set period of time has elapsed from the provision of the switching command, the communication control unit 14 determines whether information about the radio wave is output from the wireless communication unit 11 (step S105).

When no information about the radio wave is output from the wireless communication unit 11 (NO in step S105), the communication control unit 14 provides a restoration command to the display control unit 15 (step S108), and returns to step S101. On the other hand, when information about the radio wave is output from the wireless communication unit 11 (YES in step S105), the communication control unit 14 finds the radio field intensity of the mobile terminal 20 (step S106) as in the case of step S102. The communication control unit 14 determines whether the radio field intensity is less than the second threshold (step S107).

When the radio field intensity is greater than or equal to the second threshold (NO in step S107), the communication control unit 14 returns to step S105. On the other hand, when the radio field intensity is less than the second threshold (YES in step S107), the communication control unit 14 provides a restoration command to the display control unit 15 (step S108), and returns to step S101. The communication control unit 14 repeatedly executes a process of a series shown in step S101 to step S108.

Figure 6:
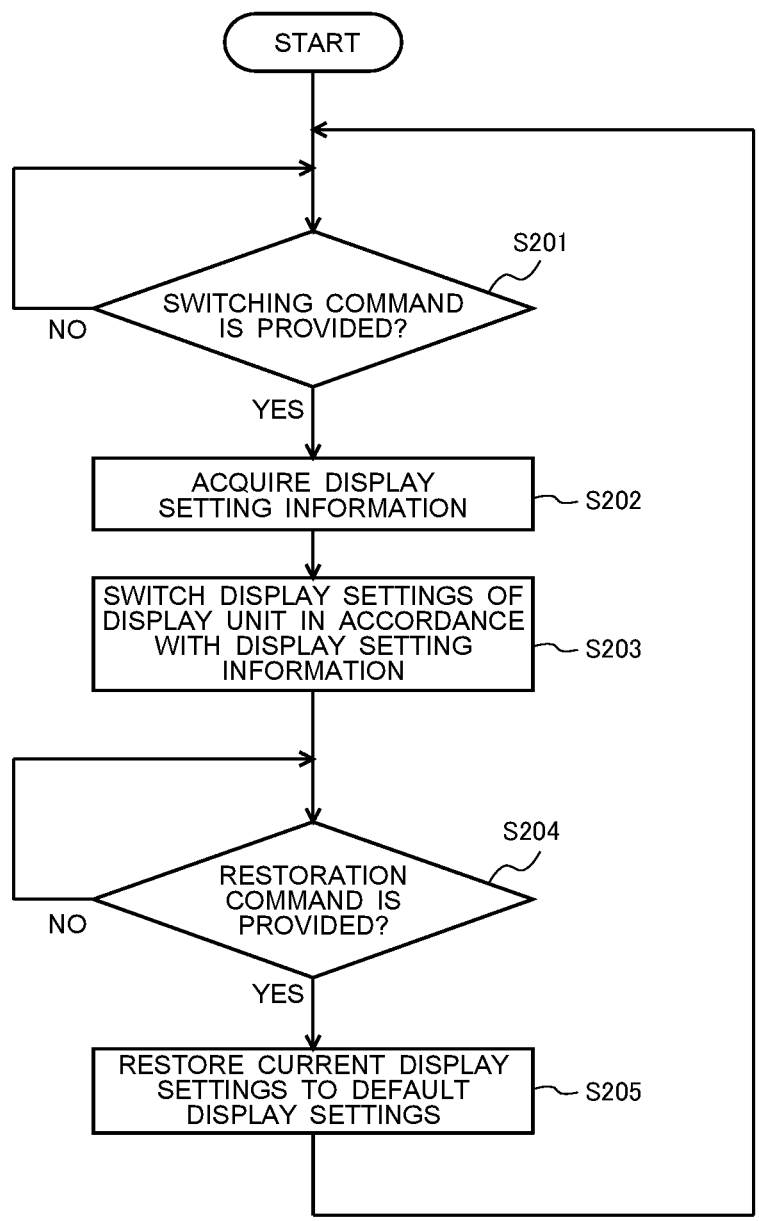
FIG. 6 is a flowchart showing the operation of a display control unit when the management device of FIG. 1 detects one mobile terminal.

FIG. 6 is a flowchart showing the operation of the display control unit 15 when the management device 10 of FIG. 1 detects one mobile terminal 20. The details of process that is executed by the display control unit 15 will be described with reference to FIG. 6.

The display control unit 15 is on standby until the switching command is provided from the communication control unit 14 (NO in step S201). When the switching command is provided from the communication control unit 14 (YES in step S201), the display control unit 15 acquires the display setting information from the mobile terminal 20 via the wireless communication unit 11 (step S202). The display control unit 15 switches the display settings of the display unit 17 to the display settings of the mobile terminal 20 in accordance with the display setting information acquired from the mobile terminal 20. That is, the display control unit 15 switches the display settings of the display unit 17 to the display settings of the mobile terminal 20 in such a manner that the degree of visibility of text on the display unit 17 is the same as that of text of the mobile terminal 20. Of course, when the display settings represented by the display setting information are the same as the default display settings, no change is required from the current display settings, so the display control unit 15 keeps the current display settings (step S203).

Subsequently, the display control unit 15 is on standby until a restoration command is provided from the communication control unit 14 (NO in step S204). When the restoration command is provided from the communication control unit 14 (YES in step S204), the display control unit 15 restores the display settings of the display unit 17 to the default display settings. That is, the display control unit 15 switches the display settings of the display unit 17, adjusted to the display settings of the mobile terminal 20, to the default display settings in response to the restoration command from the communication control unit 14 (step S205).

The display control unit 15 repeatedly executes a process of a series shown in step S201 to step S205 as described above.

Figure 7:
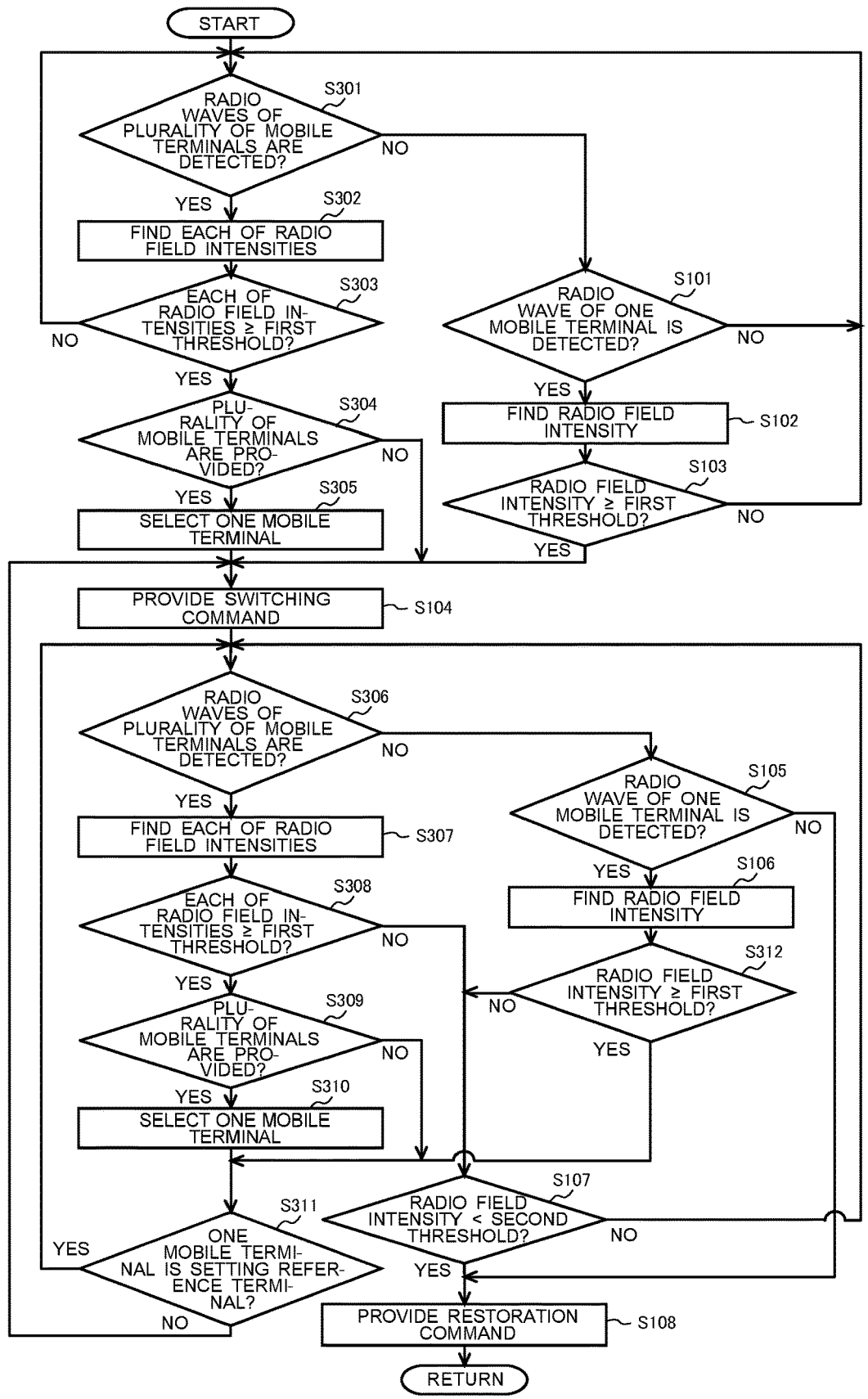
FIG. 7 is a flowchart showing the operation of the communication control unit when the management device of FIG. 1 detects one or a plurality of mobile terminals.

FIG. 7 is a flowchart showing the operation of the communication control unit 14 when the management device 10 of FIG. 1 detects one or a plurality of the mobile terminals 20. The details of process that is executed by the communication control unit 14 in a situation that one or a plurality of the mobile terminals 20 enters or leaves a room in which the management device 10 is provided will be described with reference to FIG. 7. The same reference signs denote steps equivalent to those of FIG. 5, and the description of the steps is omitted.

The communication control unit 14 is on standby until the wireless communication unit 11 detects the radio wave of at least one of the mobile terminals 20 (NO in step S301 and NO in step S101). When the wireless communication unit 11 detects the radio waves of a plurality of the mobile terminals 20 (YES in step S301), the wireless communication unit 11 outputs information about the detected radio waves to the communication control unit 14. The communication control unit 14 finds the radio field intensities of the plurality of mobile terminals 20 on the basis of the information about the radio waves output from the wireless communication unit 11 (step S302).

Subsequently, the communication control unit 14 determines whether each of the found radio field intensities is greater than or equal to the first threshold (step S303). When there is no mobile terminal 20 whose radio field intensity is greater than or equal to the first threshold (NO in step S303), the communication control unit 14 returns to step S301 without executing any process.

On the other hand, when there is a plurality of the mobile terminals 20 whose radio field intensities are each greater than or equal to the first threshold (YES in step S303 and YES in step S304), the communication control unit 14 selects the mobile terminal 20 whose radio field intensity is the greatest (step S305). The communication control unit 14 provides the display control unit 15 with a switching command to switch the display settings of the management device 10 into the display settings of the selected mobile terminal 20 (step S104). When there is one mobile terminal 20 whose radio field intensity is greater than or equal to the first threshold (YES in step S303 and NO in step S304), the communication control unit 14 provides the display control unit 15 with a switching command to switch the display settings of the management device 10 into the display settings of that mobile terminal 20 (step S104).

When the wireless communication unit 11 detects the radio wave of one mobile terminal 20 (NO in step S301 and YES in step S101), the wireless communication unit 11 executes a process of a series of step S102 to step S104 as in the case of FIG. 5.

Subsequently, at the timing at which the wireless communication unit 11 detects radio waves of the mobile terminals 20 next time, the communication control unit 14 determines whether the wireless communication unit 11 detects the radio wave of at least one of the mobile terminals 20. That is, by the time when a set period of time elapses from the provision of the switching command, the communication control unit 14 determines whether information about any radio wave has been output from the wireless communication unit 11 (step S306 and step S105).

When no information about the radio wave is output from the wireless communication unit 11 (NO in step S105), the communication control unit 14 provides a restoration command to the display control unit 15 (step S108), and returns to step S301. On the other hand, when information about the radio waves of a plurality of the mobile terminals 20 is output from the wireless communication unit 11 (YES in step S306), the communication control unit 14 finds the radio field intensities of the plurality of mobile terminals 20 on the basis of the information about the radio waves (step S307) as in the case of step S302.

Subsequently, the communication control unit 14 determines whether each of the found radio field intensities is greater than or equal to the first threshold (step S308) as in the case of step S303. When there is no mobile terminal 20 whose radio field intensity is greater than or equal to the first threshold (NO in step S308), the communication control unit 14 determines whether the radio field intensity of a setting reference terminal is less than the second threshold (step S107). The setting reference terminal is the mobile terminal 20 based on which the current display settings of the management device 10 are set.

When the radio field intensity of the setting reference terminal is less than the second threshold (YES in step S107), the communication control unit 14 provides a restoration command to the display control unit 15 (step S108). On the other hand, when the radio field intensity of the setting reference terminal is greater than or equal to the second threshold (NO in step S107), the communication control unit 14 returns to step S306. That is, the management device 10 keeps the current display settings.

When there is a plurality of the mobile terminals 20 whose radio field intensities are each greater than or equal to the first threshold (YES in step S308 and YES in step S309), the communication control unit 14 selects one mobile terminal 20 whose radio field intensity is the greatest (step S310). Subsequently, the communication control unit 14 determines whether the selected mobile terminal 20 is the setting reference terminal (step S311). When the selected mobile terminal 20 is the setting reference terminal (YES in step S311), the communication control unit 14 returns to step S306. That is, the management device 10 keeps the current display settings. When the selected mobile terminal 20 is not the setting reference terminal (NO in step S311), the communication control unit 14 provides the display control unit 15 with a switching command to switch the display settings of the management device 10 into the display settings of the selected mobile terminal 20 (step S104).

When information about the radio wave of one mobile terminal 20 is output from the wireless communication unit 11 (NO in step S306 and YES in step S105), the communication control unit 14 finds the radio field intensity on the basis of the information about the radio wave, output from the wireless communication unit 11 (step S106). When the radio field intensity is less than the first threshold (NO in step S312), the communication control unit 14 proceeds to step S107. When the radio field intensity is greater than or equal to the first threshold (YES in step S312), the communication control unit 14 proceeds to step S311.

Figure 8:
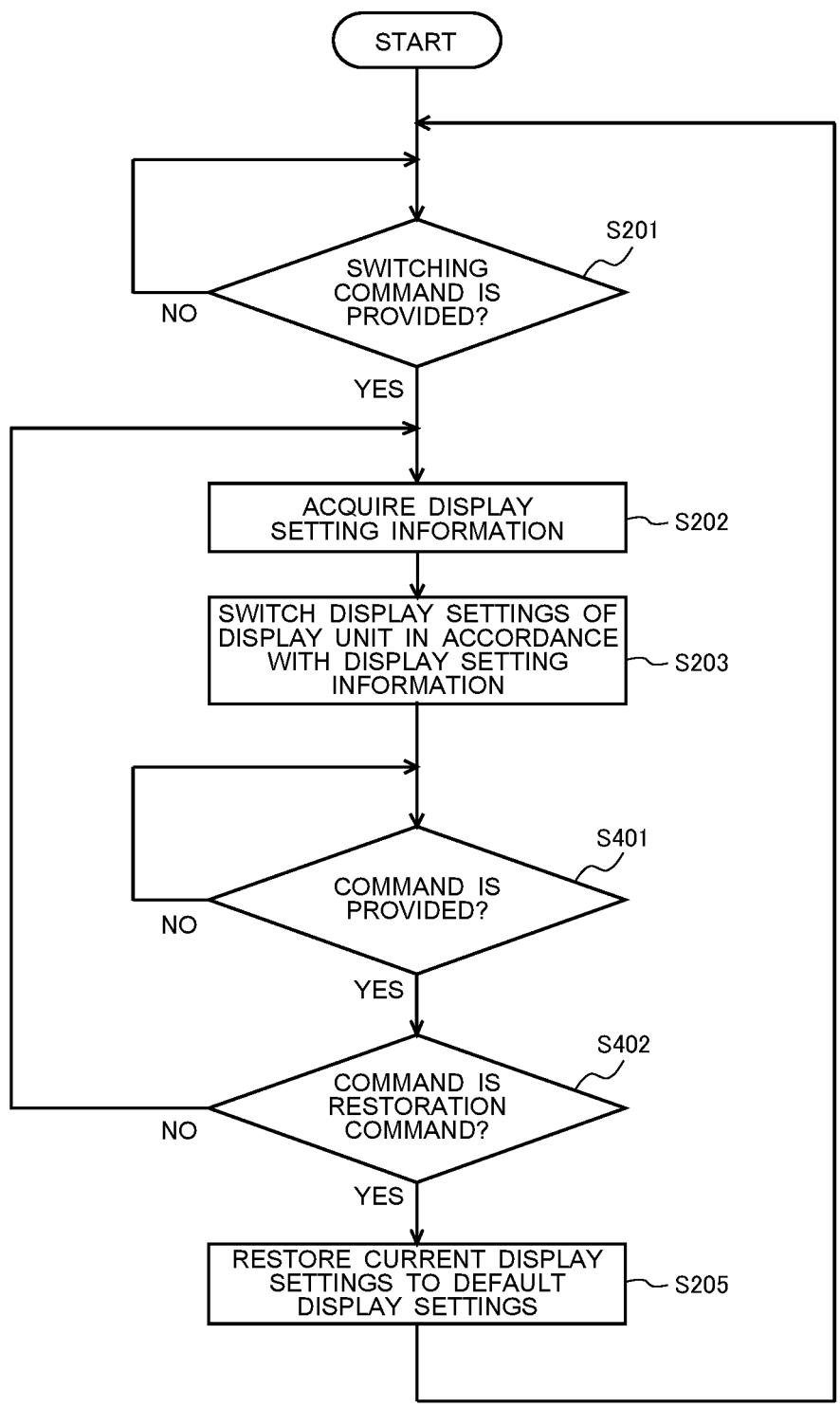
FIG. 8 is a flowchart showing the operation of the display control unit when the management device of FIG. 1 detects one or a plurality of mobile terminals.

FIG. 8 is a flowchart showing the operation of the display control unit 15 when the management device 10 of FIG. 1 detects one or a plurality of mobile terminals 20. The details of process that is executed by the display control unit 15 will be described with reference to FIG. 8. The same reference signs denote steps equivalent to those of FIG. 6, and the description of the steps is omitted.

The display control unit 15 is on standby until a switching command is provided from the communication control unit 14 (NO in step S201). When the switching command is provided from the communication control unit 14 (YES in step S201), the display control unit 15 executes the process of step S202 and step S203.

Subsequently, the display control unit 15 is on standby until a command is provided from the communication control unit 14 (NO in step S401). When the restoration command is provided from the communication control unit 14 (YES in step S401 and YES in step S402), the display control unit 15 restores the display settings of the display unit 17 to the default display settings (step S205). On the other hand, when the switching command is provided from the communication control unit 14 (YES in step S401 and NO in step S402), the display control unit 15 proceeds to step S202.

The display control unit 15 repeatedly executes a process of a series shown in step S201 to step S203, step S401, step S402, and step S205 as described above.

As described above, the management device 10 adjusts the display settings of the display unit 17 to the display settings of the mobile terminal 20 when the distance between the management device 10 and the mobile terminal 20 is shorter than the threshold. Thus, the management device 10 is able to automatically adapt the display settings of the display unit 17 to the preference of a user. Consequently, the management device 10 is able to easily and quickly perform a process of switching the display settings of the management device 10 into various display settings.

That is, the management device 10, which is originally a remote control unit, is used to perform basic operations on the apparatus 30. For example, when the apparatus 30 is an air-conditioning apparatus, the basic operations of the air-conditioning apparatus include temperature regulation and an operation to turn on or off cooling, heating, or other operation modes. Consequently, the user performs various input operations on the management device 10 and causes the management device 10 to execute the process of switching pages multiple times, and at last reaches a page to switch the languages, sizes, or other properties of text. On the other hand, in recent years, many people carry the mobile terminals 20, such as smartphones, and the mobile terminals 20 allow users to customize the language setting and the text size setting so that the users can use the mobile terminals 20 easily.

The management device 10 of Embodiment 1, when the user of the mobile terminal 20 comes close to the management device 10, switches the display settings of the display unit 17 to display settings equivalent to the display settings of the mobile terminal 20. Thus, when the communication control unit 14 determines that the radio field intensity is greater than or equal to the first threshold, the management device 10 is able to display text on the display unit 17 with the setting that the user presumably can see the text most easily. Consequently, a user close to the management device 10 is allowed to easily operate the management device 10 without an effort to change settings while referring to an instruction manual or other references each time. Hence, with the management device 10, ease of use of the apparatus 30 is improved, and an extension of ease of use of the apparatus 30 is possible.

For example, in the case of the management device 10 provided in a room of a hotel, changing the display settings at a reception desk is not required anymore, so the effort by the hotel to change the display settings is saved. In the case of the management device 10 provided at a home for the elderly, the following configuration is applicable. That is, the display settings with which a person in charge easily operates the management device 10 are set as default settings. When a person who stays or lives in the home and who carries the mobile terminal 20 comes close to the management device 10, the display settings are automatically adjusted to the display settings of the mobile terminal 20. Furthermore, in the case of the management device 10 provided in a room of a home for the elderly, the following configuration is applicable. The display settings with which a person who lives in the room easily operates the management device 10 are usually set, and, for example, when a visitor comes close to the management device 10, the display settings are automatically adjusted to the display settings of the mobile terminal 20 of the visitor.

Incidentally, a person in charge of the apparatus 30 possibly restricts a change of part or all of basic settings so that important settings are not changed by general users, and also possibly restricts a change of settings of language and text size. In such a case, for a general user to change the display settings of the management device 10 to preferred settings, the person in charge needs to help. In this respect, with the management device 10 of Embodiment 1, the display settings of the management device 10 are automatically switched to preferred settings of a general user simply when the distance between the management device 10 and the mobile terminal 20 of the general user is shorter than the threshold. Consequently, usability is improved. Furthermore, even when the distance between the management device 10 and the mobile terminal 20 of the general user is shorter than the threshold, settings other than the language setting or the text size setting are not changed by the general user. Consequently, the management device 10 meets the need of a person in charge.

When the distance between the management device 10 and the mobile terminal 20 is shorter than the threshold, the control unit 12 acquires the display setting information representing the display settings of the mobile terminal 20 from the mobile terminal 20, and switches the display settings of the display unit 17 to the display settings of the mobile terminal 20 in accordance with the acquired display setting information. That is, the management device 10 acquires the display setting information from the mobile terminal 20 in real time, so the management device 10 is able to automatically make the display settings of the display unit 17 follow a change of the preference of a user.

Incidentally, when a language with which a user is unfamiliar is used as the default language of the management device 10, changing the display settings is very difficult. For example, at locations where there are people who use various languages, such as hotels and multi-national corporations, or at locations that any number of people use, such as internet cafes, when the display settings of the management device 10 are set to one settings, ease of use can considerably decrease. In this respect, in the case where the display setting information contains information representing the language setting, the language setting of the management device 10 is switched to the language setting of the everyday-use mobile terminal 20 when the distance between the management device 10 and the mobile terminal 20 is shorter than the threshold. Consequently, the management device 10 that is excellent in ease of use is provided for a plurality of users who use different languages.

The default text size of the management device 10 tends to be reduced for the purpose of displaying a larger amount of information, so elderly users can hardly read such text. For example, at locations where elderly users visit or stay, such as homes for the elderly, when the text size setting of the management device 10 is fixed to one setting, ease of use can considerably decrease. In this respect, in the case where the display setting information contains information representing the text size setting, the text size setting of the management device 10 is switched to the text size setting of the everyday-use mobile terminal 20 when the distance between the management device 10 and the mobile terminal 20 is shorter than the threshold. Consequently, the management device 10 with improved ease of use is provided for elderly users.

In Embodiment 1, when the intensity of a wireless signal transmitted by the mobile terminal 20 is greater than the first threshold corresponding to the threshold, the control unit 12 adjusts the display settings of the display unit 17 to the display settings of the mobile terminal 20. The setting of the first threshold can be changed for the size, layout, and other factors, of a room in which the apparatus 30 is installed. Consequently, with the management device 10, a flexible change of the display settings for the need of a user is achieved.

After the control unit 12 adjusts the display settings of the display unit 17 to the display settings of the mobile terminal 20, when the intensity of a wireless signal transmitted by the mobile terminal 20 becomes less than the second threshold, the control unit 12 switches the display settings of the display unit 17 to the default display settings. As the second threshold is set to be less than the first threshold, hunting that the process of switching the display settings is repeated in a short span by a temporary decrease in radio field intensity is reduced, with the result that control is stabilized.

Furthermore, when the detection unit 11a detects wireless signals that are transmitted by the respective mobile terminals 20, the control unit 12 adjusts the display settings of the display unit 17 to the display settings of the mobile terminal 20 that transmits the wireless signal whose intensity is the greatest. In this manner, even when there is a plurality of the mobile terminals 20 in a room or another location where the management device 10 is provided, the management device 10 selects one mobile terminal 20 on the basis of the intensity of the wireless signal. Consequently, the management device 10 is able to uniformly switch the display settings of the display unit 17 on the basis of the arrangement relationship among a plurality of the mobile terminals 20.

In addition, when the language setting represented by the display setting information is different from the default language setting, the control unit 12 transmits text information to be displayed on the display unit 17 to the external server 45, and causes the display unit 17 to display text information of translation data returned from the external server 45. Thus, memory resources to store a translation database that supports translation into multiple languages are not required, so memory resources can be reduced.

The radio field intensity computing unit 14a finds the average of radio waves detected by the wireless communication unit 11 in a set period of time as a radio field intensity, so detection error or other errors of the wireless communication unit 11 are reduced. Consequently, the accuracy of determination by the intensity determination unit 14b is increased, with the result that a distance between the management device 10 and the mobile terminal 20 is accurately acquired.

Incidentally, in Embodiment 1, the case where the display setting information represents the language setting and the text size setting is illustrated; however, the display setting information is not limited to the one as described. The display setting information may represent at least one of the language setting and the text size setting. The display setting information may contain information of another setting, such as a font setting, in addition to the information of at least one of the language setting and the text size setting.

Furthermore, the display setting information may contain a background image setting of the mobile terminal 20. With this configuration, a photo or another image displayed on a standby screen of the mobile terminal 20 is displayed on the display unit 17 of the management device 10, for example, during a stay at a hotel, so comfort of a user is improved. When the background of the standby screen or another screen of the mobile terminal 20 is changed, the background of the display unit 17 of the management device 10 also switches accordingly to the background of the mobile terminal 20, so the environment of a stay of a user is improved.

<Modification 1-1>

In the above description, the example in which an unnecessary switching process is reduced by adjusting the first threshold and the second threshold is described. Instead, another configuration may be employed.

For example, FIG. 5 and FIG. 7 illustrate the process in which, when the radio field intensity of the setting reference terminal is less than the second threshold, the communication control unit 14 provides the restoration command to the display control unit 15 (YES in step S107, and step S108); however, the process is not limited to the one as described. For example, when the radio field intensity is less than the second threshold, the communication control unit 14 may receive information about a radio wave again from the wireless communication unit 11 after a lapse of re-determination standby time and determine whether the radio field intensity of the setting reference terminal is less than the second threshold. Subsequently, when the communication control unit 14 determines that the radio field intensity of the setting reference terminal is less than the second threshold, the communication control unit 14 may provide the restoration command to the display control unit 15.

With this configuration, even when a person who stays in a room temporarily moves away from the management device 10, the display settings of the management device 10 are not switched until the re-determination standby time elapses. Thus, hunting is reduced, so control is stabilized, and the convenience of a user is improved.

In addition, the management device 10 may turn off the communication function of the wireless communication unit 11 until the re-determination standby time elapses. With this configuration, the wireless communication unit 11 does not detect an unnecessary radio wave, so communication cost is reduced.

The communication control unit 14 may be configured to, until predetermined waiting time elapses after the communication control unit 14 provides the switching command, not receive information about the radio wave from the wireless communication unit 11 or execute a process of determining a radio field intensity. More specifically, the communication control unit 14, for example, may execute a process of being on standby until waiting time elapses after step S104 in FIG. 5 or FIG. 7.

With this configuration, even when a person who stays in a room temporarily moves away from the management device 10, the display settings of the management device 10 do not switch until the waiting time elapses. Even when there is a plurality of persons in a room in which the management device 10 is provided and each person carries the mobile terminal 20, the display settings of the management device 10 do not switch until the waiting time elapses. Thus, hunting is reduced, so control is stabilized, and the convenience of a user is improved.

In addition, the management device 10 may turn off the communication function of the wireless communication unit 11 until the waiting time elapses. With this configuration, the wireless communication unit 11 does not detect an unnecessary radio wave, so communication cost is reduced.

<Modification 1-2>

Furthermore, when the mobile terminal 20 once enters an area in which the radio field intensity is greater than or equal to the first threshold and the display settings of the management device 10 are switched to the display settings of the mobile terminal 20, the display settings of the management device 10 may be kept even when the mobile terminal 20 moves away from the management device 10 unless a predetermined cancellation condition is satisfied. The predetermined cancellation condition includes a process such as switching the display settings to the default settings. Switching the display settings to the default settings may be implemented by a cancellation operation performed by a person in charge after check-out of a hotel or other accommodations or may be performed by, for example, switching pairing passwords by a person in charge.

More specifically, after the distance between the management device 10 and the mobile terminal 20 becomes shorter than the threshold and the display settings of the management device 10 are switched to the display settings of the mobile terminal 20, the display control unit 15 causes the display unit 17 to display an image for setting keep mode to keep the display settings. The image for setting the keep mode is, for example, a virtual button having, for example, word "KEEP." As a user operates the input unit 18 and specifies the image for setting the keep mode, the input unit 18 transmits an instruction signal to set the keep mode to the control unit 12. Thus, the control unit 12 keeps the display settings of the management device 10 until the predetermined cancellation condition is satisfied.

Of course, after the distance between the management device 10 and the mobile terminal 20 becomes shorter than the threshold and the display settings of the management device 10 are switched to the display settings of the mobile terminal 20, the terminal display processing unit 23c may cause the terminal display unit 21a to display an image for setting the keep mode. In this case, as a user operates the terminal input unit 21b and specifies the image for setting the keep mode, the mobile terminal 20 transmits an instruction signal to set the keep mode to the management device 10.

After the distance between the management device 10 and the mobile terminal 20 becomes shorter than the threshold and the display settings of the management device 10 are switched to the display settings of the mobile terminal 20, the display settings of the management device 10 may be kept until the distance between the management device 10 and another mobile terminal 20 whose display settings are different from the current display settings of the management device 10 becomes shorter than the threshold. That is, the management device 10 may be configured not to change the display settings unless another user carrying the mobile terminal 20 whose display settings are different from the current display settings of the management device 10 enters the area in which the radio field intensity is greater than or equal to the first threshold. In this case, the condition that the distance between the management device 10 and another mobile terminal 20 whose display settings are different from the current display settings of the management device 10 becomes shorter than the threshold is the predetermined cancellation condition.

With such a configuration, a guest who stays at a hotel or other accommodations in a row is allowed to continuously use the management device 10 having display settings adapted to the preference during the stay. As the wireless function of the mobile terminal 20 depletes a battery, the wireless function may not always be on. In this respect, in the case where the display settings of the management device 10 once switch, the preferred display settings of a user are kept even when the wireless function of the mobile terminal 20 is turned off. Thus, depletion of the battery is reduced, and the convenience of a user is improved.

<Modification 2>

Figure 9:
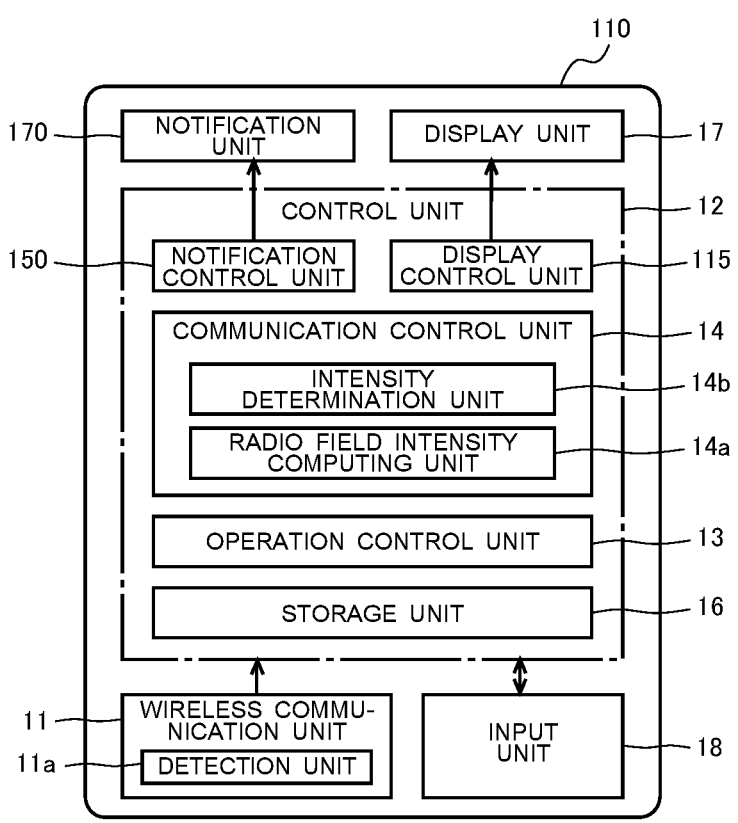
FIG. 9 is a block diagram showing the functional configuration of the management device according to Modification 2 of Embodiment 1 of the present invention.

FIG. 9 is a block diagram showing the functional configuration of a management device 110 according to Modification 2 of Embodiment 1 of the present invention. The same reference signs denote components equivalent to those of the management device 10, and the description of the components is omitted.

As shown in FIG. 9, the management device 110 of Modification 2 includes a notification control unit 150 and a notification unit 170. The notification unit 170 provides visual recognition prompting information with sound or voice. The visual recognition prompting information prompts a person in a room to visually recognize the management device 110. The notification unit 170 includes a speaker.

When the communication control unit 14 determines that the radio field intensity is greater than or equal to the first threshold, the notification control unit 150 causes the notification unit 170 to provide the visual recognition prompting information. For example, the notification control unit 150 may cause the notification unit 170 to issue beep sound or other sound to cause a person to notice the visual recognition prompting information. The notification control unit 150 may cause the notification unit 170 to issue voice like "Are Display Settings To Be Fixed?" or "Please Check Screen" as the visual recognition prompting information. The notification control unit 150 may cause the notification unit 170 to issue beep sound or other sound and then issue voice as the visual recognition prompting information.

A display control unit 115 of Modification 2 causes the display unit 17 to display fix determination information when the communication control unit 14 determines that the radio field intensity is greater than or equal to the first threshold. The fix determination information asks whether the display settings need to be fixed. More specifically, when there is one mobile terminal 20 whose radio field intensity is greater than or equal to the first threshold in a room or another location in which the management device 110 is installed, the display control unit 115 causes the display unit 17 to display the fix determination information in conformity with the display settings of the mobile terminal 20. When there is a plurality of the mobile terminals 20 whose radio field intensities are each greater than or equal to the first threshold in a room or another location in which the management device 110 is installed, the display control unit 115 causes the display unit 17 to display the fix determination information in conformity with the display settings of the mobile terminal 20 selected by the intensity determination unit 14b.

The fix determination information contains, for example, fix information showing "Fix Display Settings" and non-fix information showing "Do Not Fix Display Settings." As a person in the room selects the fix information by operating the input unit 18, the display control unit 115 executes a process of fixing the display settings of the display unit 17. That is, when the fix information is selected through the input unit 18, the display control unit 115 keeps the display settings based on the switching command from the communication control unit 14 until set keeping time elapses. The remaining configuration of the display control unit 115 is similar to that of the display control unit 15.

The set keeping time is a period of time until the fixed display settings are cancelled. The set keeping time may be stored in the storage unit 16 in advance, and is preferably changed as needed. The display control unit 115 may cause the display unit 17 to display a field to input the set keeping time together with the fix determination information or in response to an input operation for the fix determination information.

The display control unit 115 may execute the process of fixing the display settings of the display unit 17 in accordance with the set keeping time input through the input unit 18. Of course, the display control unit 115 may cause the display unit 17 to display not a field to input the set keeping time but a field to input a time at which the fixed display settings are cancelled. The display control unit 115 may find set keeping time on the basis of a time input through the input unit 18 and execute the process of fixing the display settings of the display unit 17 in accordance with the found set keeping time.

The communication control unit 14 may transmit the notification command to the notification control unit 150 at the time when the management device 110 transmits the switching command to the display control unit 115. Alternatively, the display control unit 115 may transmit the notification command to the notification control unit 150 at the time when the management device 110 receives the switching command from the communication control unit 14.

The display control unit 115 may, after a lapse of determination standby time from when the fix determination information is displayed, erase the fix determination information from the display unit 17 and stop accepting the process of fixing the display settings. The determination standby time is preferably optionally changed.

Figure 10:
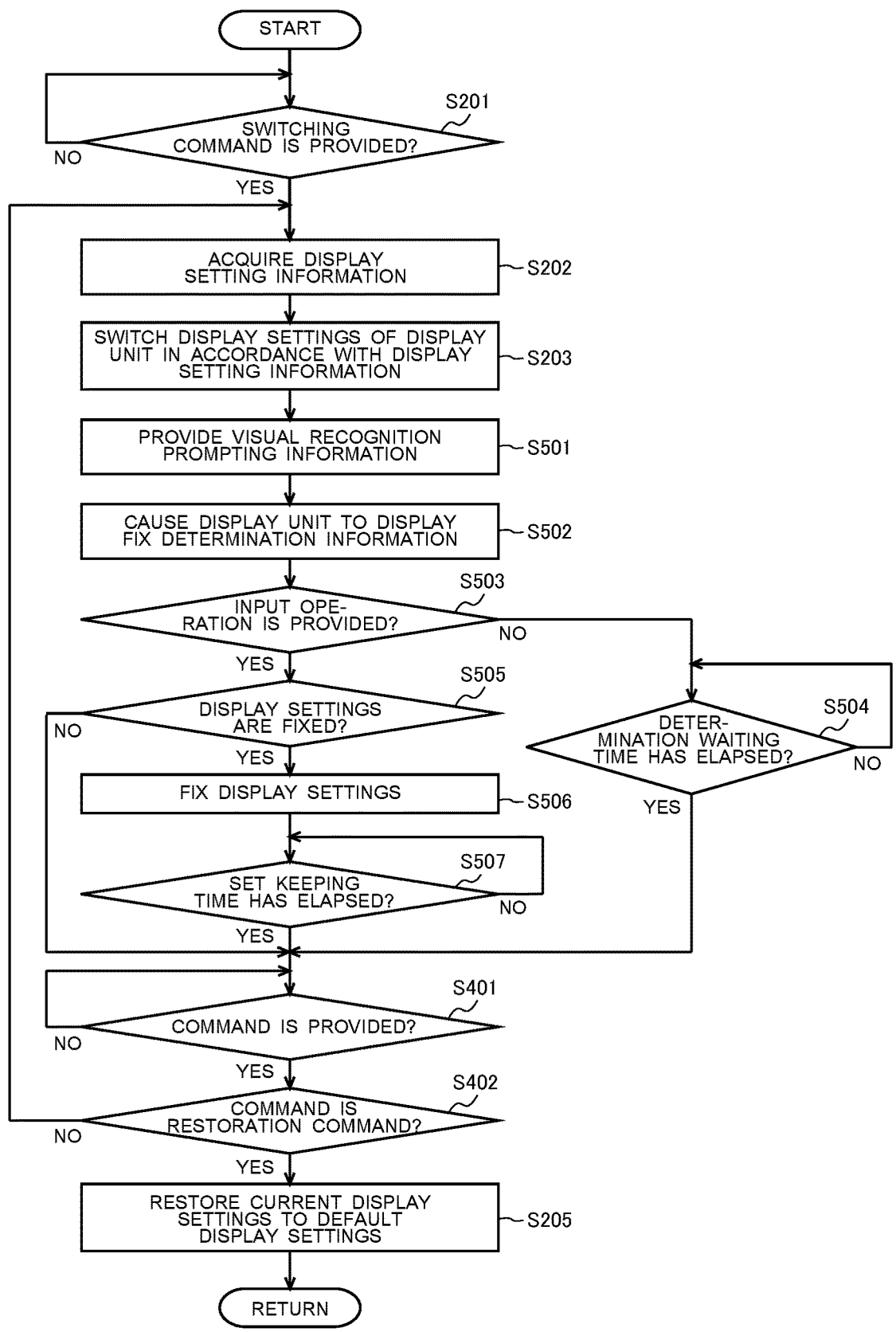
FIG. 10 is a flowchart showing the operation of a control unit that the management device of FIG. 9 includes.

FIG. 10 is a flowchart showing the operation of the control unit 12 of the management device 110 of FIG. 9. The details of process that is executed by the display control unit 115 and the notification control unit 150 will be described with reference to FIG. 10. The same reference signs denote steps equivalent to those of FIG. 8, and the description of the steps is omitted.

The display control unit 115 is on standby until the switching command is provided from the communication control unit 14 (NO in step S201). When the switching command is provided from the communication control unit 14 (YES in step S201), the display control unit 115 executes the process of step S202 and step S203. Subsequently, the notification control unit 150 causes the notification unit 170 to notify the visual recognition prompting information (step S501), and the display control unit 115 causes the display unit 17 to display the fix determination information on the basis of the display settings switched in step S203 (step S502).

Subsequently, the display control unit 115 is on standby until an input operation is made before the determination standby time elapses (NO in step S503 and NO in step S504). When the determination standby time elapses before an input operation is made (YES in step S504), the display control unit 115 proceeds to step S401.

When an input operation is made to issue an instruction to fix the display settings before the determination standby time elapses (YES in step S503 and YES in step S505), the display control unit 115 fixes the display settings of the display unit 17 to the display settings switched in step S203 (step S506). That is, until the set keeping time elapses, the display control unit 115 keeps the language setting and text size setting of the display unit 17 at the settings switched in step S203 (NO in step S507). As the set keeping time elapses (YES in step S507), the display control unit 115 proceeds to step S401. On the other hand, when an input operation is made to issue an instruction not to fix the display settings before the determination standby time elapses (YES in step S503 and NO in step S505), the display control unit 115 proceeds to step S401.

As described above, when the communication control unit 14 determines that the radio field intensity is greater than or equal to the first threshold, the management device 110 in Modification 2 causes the display unit 17 to display the fix determination information. Thus, a user is allowed to determine whether the display settings need to be fixed, so flexible display settings for the usage of a user are achieved.

The management device 110 may turn off the communication function of the wireless communication unit 11 while the display settings are fixed. With this configuration, the wireless communication unit 11 does not detect an unnecessary radio wave, so communication cost is reduced.

When the communication control unit 14 determines that the radio field intensity is greater than or equal to the first threshold, the management device 110 causes the notification unit 170 to provide the visual recognition prompting information. Thus, it is possible to draw user's attention, so the user is made to recognize that the display settings can be fixed, and the user is allowed to determine whether the display settings need to be fixed. Of course, the management device 110 may not include the notification control unit 150 and the notification unit 170. With this configuration as well, for example, by informing the function of fixing the display settings at a reception desk or another location of a hotel, preparing a manual for the function in a room or another location of the hotel, or other methods, a person who stays at the hotel is prompted to visually recognize the management device 110, and to determine whether the display settings need to be fixed.

Incidentally, in Modification 2, the case where the management device 110 includes the notification control unit 150 and the notification unit 170 is illustrated; however, the management device 110 is not limited to the one as described. For example, the management device 110 may be configured as follows. When the communication control unit 14 determines that the radio field intensity is greater than or equal to the first threshold, the display control unit 115 may cause the display unit 17 to illuminate. Alternatively, the management device 110 may include an illumination control unit and an illumination unit (both are not shown) instead of the notification control unit 150 and the notification unit 170 or in addition to the notification control unit 150 and the notification unit 170. The illumination unit includes, for example, an LED. That is, in the management device 110, the illumination control unit may cause the illumination unit to illuminate when the communication control unit 14 determines that the radio field intensity is greater than or equal to the first threshold.

<Modification 3-1>

In the above-description, the case where, when the language setting represented by the display setting information does not coincide with the default language setting, the display control unit 15 transmits text information to be displayed on the display unit 17 to the external server 45 and causes the external server 45 to translate the text is illustrated; however, the configuration is not limited to the one as described.

For example, a translation database for translating text information to be displayed on the display unit 17 from a default language into another language may be previously stored in the storage unit 16. The translation database supports translation from a certain language into at least one other language. The translation database may support, for example, translation into languages of about five countries, that is, Japan, United States, China, France, and Germany. Furthermore, the translation database is preferably configured so that a database that supports translation into a language of one country or languages of two countries can be added. The translation database may be acquired by the control unit 12 from the external server 45 or other devices through the network 50.

The display control unit 15 preferably has a function of determining whether the translation database stored in the storage unit 16 supports translation into the language represented by the display setting information. When the translation database supports translation into the language represented by the display setting information, the display control unit 15 preferably generates translation data by translating text to be displayed on the display unit 17 with the use of the translation database. When the translation database does not support the language represented by the display setting information, the display control unit 15 preferably transmits text information to be displayed on the display unit 17 to the external server 45 and cause the external server 45 to translate the information.

That is, when a language not held in the management device 10 is used at the mobile terminal 20, the display control unit 15 may provide the mobile terminal 20 with a message to be displayed on the display unit 17. The mobile terminal 20 may perform a translation job by accessing the external server 45 through the Internet, and the management device 10 may acquire the translated message from the mobile terminal 20 and cause the display unit 17 to display text information of the translated message. Of course, the management device 10 may directly perform a translation job by accessing the external server 45 through the Internet.

With this configuration, the management device 10 is able to control a device that executes a translation process. For example, the management device 10 executes inside a translation process into a language whose frequency of use of a user is high and executes outside a translation process into a language whose frequency of use of the user is low. Consequently, a translation process into a specific language is made more quickly, and a translation process into various languages is implemented.

<Modification 3-2>

In the above description, the case where the external server 45 is caused to translate text information to be displayed on the display unit 17 is illustrated; however, a device that translates text information to be displayed on the display unit 17 is not limited to the external server 45. As long as the language setting represented by the display setting information is different from the default language setting, the control unit 12 may transmit text information to be displayed on the display unit 17 to the mobile terminal 20 provided with a function of generating translation data by translating text information. The control unit 12 may cause the display unit 17 to display text information of the translation data returned from the mobile terminal 20.

More specifically, the information generating program of Modification 3-2 includes a translation application that provides the mobile terminal 20 with the function of generating translation data by translating text information. Consequently, the mobile terminal 20 is able to generate translation data by translating text information that is transmitted from the management device 10.

As described above, in Modification 3-2, the translation process can be executed by using the mobile terminal 20 without intervening the external server 45. As no network 50 intervenes in communication between the management device 10 and the mobile terminal 20, the communication load is lighter than the communication load between the management device 10 and the external server 45. That is, with the management device 10 of Modification 3-2, the communication load in the translation process is reduced, so the processing load of the management device 10 is reduced.
<Modification 4>

Figure 11:
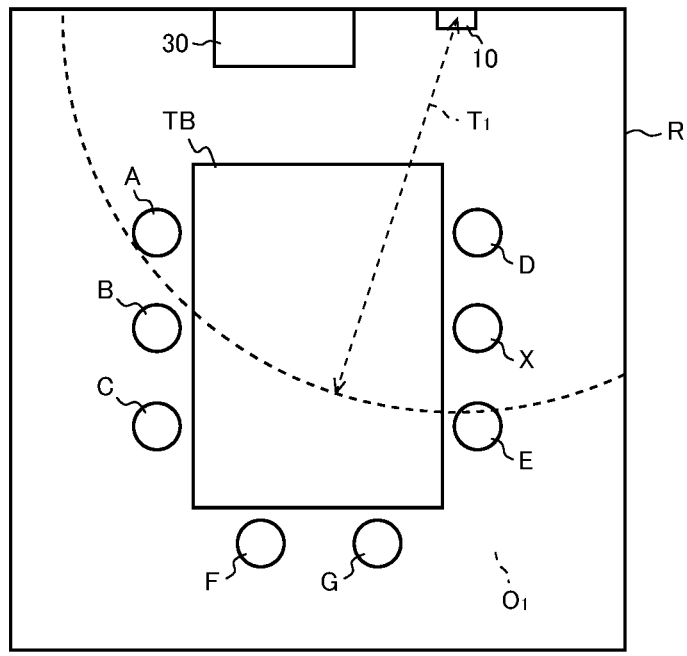
FIG. 11 is an illustrative diagram illustrating an example of a situation that there is a plurality of users each carrying the mobile terminal in a room in which an apparatus is provided according to Modification 4 of Embodiment 1 of the present invention.
Figure 12:
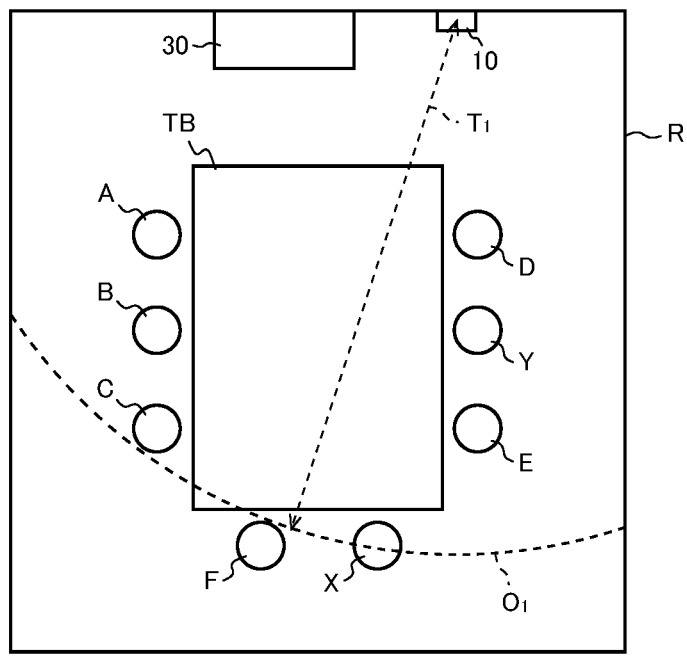
FIG. 12 is an illustrative diagram showing another example of a situation that there is a plurality of users each carrying the mobile terminal in a room in which the apparatus is provided according to Modification 4 of Embodiment 1 of the present invention.

FIG. 11 is an illustrative diagram illustrating an example of a situation that there is a plurality of users each carrying the mobile terminal 20 in a room in which the apparatus 30 is provided according to Modification 4 of Embodiment 1 of the present invention. FIG. 12 is an illustrative diagram illustrating another example of a situation that there is a plurality of users each carrying the mobile terminal 20 in a room in which the apparatus 30 is provided according to Modification 4 of Embodiment 1 of the present invention. The configuration of a management device of Modification 4 is equivalent to that of the management devices 10 and 110. For the sake of convenience, the same reference signs to those of the management device 10 are used, and the description of the components is omitted.

In Modification 4, there are information generating programs having different priorities. For example, there may be an information generating program intended for a general user, an information generating program intended for a person in charge, and an information generating program intended for a serviceman. In this case, the priority of the information generating program intended for a general user is set to the lowest level, and the priority of the information generating program intended for a serviceman is set to the highest level.

When the distances between the management device 10 and a plurality of the mobile terminals 20 are each shorter than the threshold, the control unit 12 adjusts the display settings of the display unit 17 to the display settings of the mobile terminal 20 in which the information generating program whose priority is the highest is installed. When the distances between the management device 10 and a plurality of the mobile terminals 20 each in which the information generating program whose priority is the highest is installed are each shorter than the threshold, the control unit 12 preferably adjusts the display settings of the display unit 17 to the display settings of the mobile terminal 20 that transmits the wireless signal whose intensity is the greatest among the mobile terminals 20.

An example in which the mobile terminals 20 each in which the information generating program intended for a general user is installed and the mobile terminals 20 each in which the information generating program intended for a person in charge is installed are in the room R will be specifically described with reference to FIG. 11 and FIG. 12.

In the example of FIG. 11, the information generating program intended for a general user is installed in each of the mobile terminals 20 of persons A to G, and the information generating program intended for a person in charge is installed in the mobile terminal 20 of a person in charge X. The distances between the management device 10 and the mobile terminals 20 of the person A, the person D, and the person in charge X are each shorter than the threshold $T_1$. Consequently, in the example of FIG. 11, the wireless communication unit 11 detects the radio waves of the mobile terminals 20 of the person A, person D, and person in charge X. The radio field intensity computing unit 14a identifies the radio waves detected by the wireless communication unit 11 in association with the respective mobile terminals 20, and finds the radio field intensities of the respective mobile terminals 20. The intensity determination unit 14b determines that the radio field intensities of the mobile terminals 20 of the person A, person D, and person in charge X are each greater than or equal to the first threshold.

The intensity determination unit 14b of Modification 4 has a function of, when there is a plurality of the mobile terminals 20 whose radio field intensity is greater than or equal to the first threshold, selecting the mobile terminal 20 in which the information generating program whose priority is the highest is installed. That is, in the case of the example of FIG. 11, the intensity determination unit 14b selects the mobile terminal 20 of the person in charge X in which the information generating program intended for a person in charge is installed. Consequently, the intensity determination unit 14b provides the display control unit 15 with a switching command to switch the display settings of the management device 10 into the display settings of the mobile terminal 20 of the person in charge X.

In the example of FIG. 12, the information generating program intended for a general user is installed in each of the mobile terminals 20 of persons A to F, and the information generating program intended for a person in charge is installed in each of the mobile terminals 20 of a person in charge X and person in charge Y. The distances between the management device 10 and the mobile terminals 20 of the persons A to E, person in charge X, and person in charge Y are each shorter than the threshold $T_1$. Consequently, in the example of FIG. 12, the wireless communication unit 11 detects the radio waves of the mobile terminals 20 of the persons A to E, person in charge X, and person in charge Y. The radio field intensity computing unit 14a identifies the radio waves detected by the wireless communication unit 11 in association with the respective mobile terminals 20, and finds the radio field intensities of the respective mobile terminals 20. The intensity determination unit 14b determines that the radio field intensities of the mobile terminals 20 of the persons A to E, person in charge X, and person in charge Y are each greater than or equal to the first threshold.

In the case of the example of FIG. 12, the intensity determination unit 14b first selects the mobile terminal 20 of the person in charge X and the mobile terminal 20 of the person in charge Y. When the distances between the management device 10 and a plurality of the mobile terminals 20 each in which the information generating program whose priority is the highest is installed are each shorter than the threshold, the intensity determination unit 14b of Modification 4 selects the mobile terminal 20 that transmits the wireless signal whose intensity is the greatest. That is, in the case of the example of FIG. 12, the intensity determination unit 14b selects the mobile terminal 20 of the person in charge Y closest to the management device 10, and provides the display control unit 15 with a switching command to switch the display settings of the management device 10 into the display settings of the mobile terminal 20 of the person in charge Y. The function of selecting the mobile terminal 20 on the basis of the priority may be provided to the wireless communication unit 11. The function of selecting the mobile terminal 20 on the basis of the radio field intensity may also be provided to the wireless communication unit 11.

As described above, when the distances between the management device 10 and a plurality of the mobile terminals 20 are each shorter than the threshold, the management device 10 of Modification 4 adjusts the display settings of the display unit 17 to the display settings of the mobile terminal 20 in which the information generating program whose priority is the highest is installed. Consequently, hunting is reduced, so the convenience of a user is improved.

For example, while a serviceman is performing repair, adjustment, or other work on the apparatus 30, a general user, a person in charge, or another person can be present close to the management device 10. In such a case, if no priority is set for the plurality of mobile terminals 20, the display settings of the management device 10 will switch each time a general user or a person in charge comes closer to the management device 10 than the serviceman, so it is not convenient. In this respect, the management device 10 of Modification 4 recognizes that the priority of the mobile terminal 20 in which the information generating program intended for a serviceman is installed is the highest. Consequently, the management device 10 that does not interfere with work for repairing or adjusting the apparatus 30 by a serviceman and that is highly convenient is provided.

When the distances between the management device 10 and a plurality of the mobile terminals 20 each in which the information generating program whose priority is the highest is installed are each shorter than the threshold, the management device 10 of Modification 4 adjusts the display settings of the display unit 17 to the display settings of the mobile terminal 20 that transmits the wireless signal whose intensity is the greatest among the mobile terminals 20 each in which the information generating program whose priority is the highest is installed. Consequently, the management device 10 is able to uniformly switch the display settings of the display unit 17 on the basis of the arrangement relationship among a plurality of mobile terminals 20.

<Modification 5>

FIG. 7 shows an example in which, when the radio field intensities of two or more mobile terminals 20 having different display settings are each greater than or equal to the first threshold, the display settings of the management device 10 are adjusted to the display settings of the mobile terminal 20 whose radio field intensity is the greatest each time the radio field intensity is determined. Consequently, each time the location relation between the management device 10 and each of the two or more mobile terminals 20 changes, the display settings of the management device 10 switch. For example, the case will be described where two mobile terminals 20 having different display settings are in an area in which the radio field intensity is greater than or equal to the first threshold. In this case, when a dedicated application turns off in one of the mobile terminals 20, associated with the latest display settings of the management device 10, the display settings of the management device 10 are switched to the display settings of the other one of the mobile terminals 20, remaining in the area in which the radio field intensity is greater than or equal to the first threshold. When the radio field intensity of one of the mobile terminals 20 becomes less than the second threshold, the display settings of the management device 10 are switched to the display settings of the other one of the mobile terminals 20, remaining in the area in which the radio field intensity is greater than or equal to the first threshold. The two mobile terminals 20 having different display settings are conceivably a combination of the mobile terminal 20 having English display settings and the mobile terminal 20 having French display settings, or other combinations.

Even when the two or more mobile terminals 20 having different display settings are in the area in which the radio field intensity is greater than or equal to the first threshold, a specific person may actually operate the management device 10. There is also a case where the display settings are set to settings of a language that a relatively large number of people understand, such as English, to allow anyone to operate the management device 10.

When the management device 10 of Modification 5 executes a connection process with a plurality of the mobile terminals 20, the management device 10 causes each mobile terminal 20 to display a priority button to accept preferential selection of the display settings on its application page. The connection process corresponds to Bluetooth pairing. The application page is a page that the terminal display processing unit 23c causes the terminal display unit 21a to display when the management device 10 executes the information generating program. As a user operates the terminal input unit 21b and selects the priority button of one mobile terminal 20, the display settings of the management device 10 are fixed to the display settings of the mobile terminal 20 whose priority button is selected.

That is, when the distances between the management device 10 and a plurality of the mobile terminals 20 are each shorter than the threshold, the control unit 12 of Modification 5 executes a connection process via the wireless communication unit 11 with all the mobile terminals 20 each in which the information generating program is installed. The control unit 12 causes each mobile terminal 20 to display the priority button, and fixes the display settings of the display unit 17 to the display settings of the mobile terminal 20 whose priority button is selected. Consequently, with the management device 10 of Modification 5, for example, when a specific person intends to perform an operation or when a large number of people intend to perform an operation in common language, processing load due to frequent switching of the display settings is reduced, so the convenience of a user is improved.

<Modification 6>

The example in which, when the text size setting of the display unit 17 is not able to be changed to the same as the text size setting of the mobile terminal 20, the display control unit 15 causes the display unit 17 to reduce the size of part or all of text and causes the display unit 17 to display the text, and other examples, are described above; however, the configuration is not limited to those examples. For example, as a result of translation of text information to be displayed on the display unit 17, text of translation data can be longer than the original text information. In this case, if no measures are taken for this situation, text to be displayed need to be displayed in such a manner that the size of the text is smaller than the preference of a user.

The display control unit 15 of Modification 6 has a function of, when text obtained as a result of translating a display language or another text is long and need to be displayed in such a manner that the size of the text is reduced as compared to that of the preference of a user, reducing the count of characters of translation data to such an extent that the meaning is understandable. The display control unit 15 determines whether to reduce the count of characters for each of terms included in translation data.

A character count threshold and term correspondence data are stored in the storage unit 16 of Modification 6. The character count threshold is set on the basis of the size or other specifications of the display unit 17 of the management device and may be changed as needed. A position of each of terms on the display unit 17 may be fixed, and the sizes of displayable areas may be different. Consequently, the character count threshold may be set to each of terms. The term correspondence data is, for example, table information that associates each of terms included in translation data with abbreviation data obtained by abbreviating the term.

That is, the display control unit 15 compares the count of characters with the character count threshold for each of terms included in translation data. When the count of characters of a term included in the translation data is greater than the character count threshold, the display control unit 15 reads out abbreviation data through collating the term with the term correspondence data. The display control unit 15 causes the display unit 17 to display the read-out abbreviation data.

More specifically, when the term in original text information is a Japanese phrase that means "AUTO COOLING MODE", translation data in English is "AUTO COOLING MODE." In this case, in the term correspondence data, for example, "AUTO COOLING MODE" is associated with "AUTO COOL" as abbreviation data. The case will be described where the character count threshold is set to 12. As the count of characters of "AUTO COOLING MODE" is greater than the character count threshold, the display control unit 15 reads out "AUTO COOL" from the term correspondence data and causes the display unit 17 to display "AUTO COOL."

As described above, the display control unit 15 of Modification 6 compares the count of characters with the character count threshold for each of terms included in translation data, and causes the display unit to display an abbreviation of a term of which the count of characters is greater than the character count threshold. Thus, the size of text of translation data can be kept at a predetermined size. Consequently, the meaning of text on the display unit 17 is made understandable to a user while visibility is ensured.

<Modification 7>

When the distance between the management device 10 and the mobile terminal 20 is shorter than the threshold, the management device 10 of Modification 7 changes only the display settings of a page being currently displayed. That is, the management device 10 does not switch the display settings of pages other than the page being currently displayed at the time when the distance between the management device 10 and the mobile terminal 20 becomes shorter than the threshold. The management device 10 changes the display settings of the other pages to the display settings of the mobile terminal 20 only when a switching operation to switch from the page being currently displayed to the other page is performed.

More specifically, when the distance between the management device 10 and the mobile terminal 20 is shorter than the threshold, the control unit 12 transmits, to the external server 45, text information related to a page being currently displayed in text information to be displayed on the display unit 17. When the configuration of Modification 3-1 is applied to Modification 7, the control unit 12 translates text information related to a page being currently displayed when the translation database supports the language of the display settings of the mobile terminal 20. When the configuration of Modification 3-2 is applied to Modification 7, the control unit 12 transmits text information related to a page being currently displayed to the mobile terminal 20. The control unit 12 causes the display unit 17 to display text information of translation data returned from the external server 45 or the mobile terminal 20, or translation data generated by itself.

When the control unit 12 receives a switching operation via the input unit 18, the control unit 12 transmits text information related to another switched page in text information to be displayed on the display unit 17 to the external server 45 or the mobile terminal 20, or translates the text information related to another switched page by itself. The control unit 12 causes the display unit 17 to display text information of translation data returned from the external server 45 or the mobile terminal 20, or translation data generated by itself.

As described above, the control unit 12 of Modification 7 adjusts, of the display settings of the display unit 17, only the display settings of a page being currently displayed to the display settings of the mobile terminal 20. Consequently, when the distance between the management device 10 and the mobile terminal 20 is shorter than the threshold, only text related to a page being displayed on the management device 10 is only required to be translated, so the load of a translation process is reduced, with the result that quick switching of the display settings is achieved. In addition, when only one specific page, such as a basic page, is used, an unnecessary translation process is omitted. The memory resources of the management device 10 are reduced. In Embodiment 1 including any one of Modifications 1-1 to 7, as the display control unit 15 receives from the input unit 18 an operation signal representing the details of an operation made by a user, the display control unit 15 changes the status of display on the display unit 17 in response to the received operation signal. This note also applies to Embodiments 2 to 4 described later.

Embodiment 2

Figure 13:
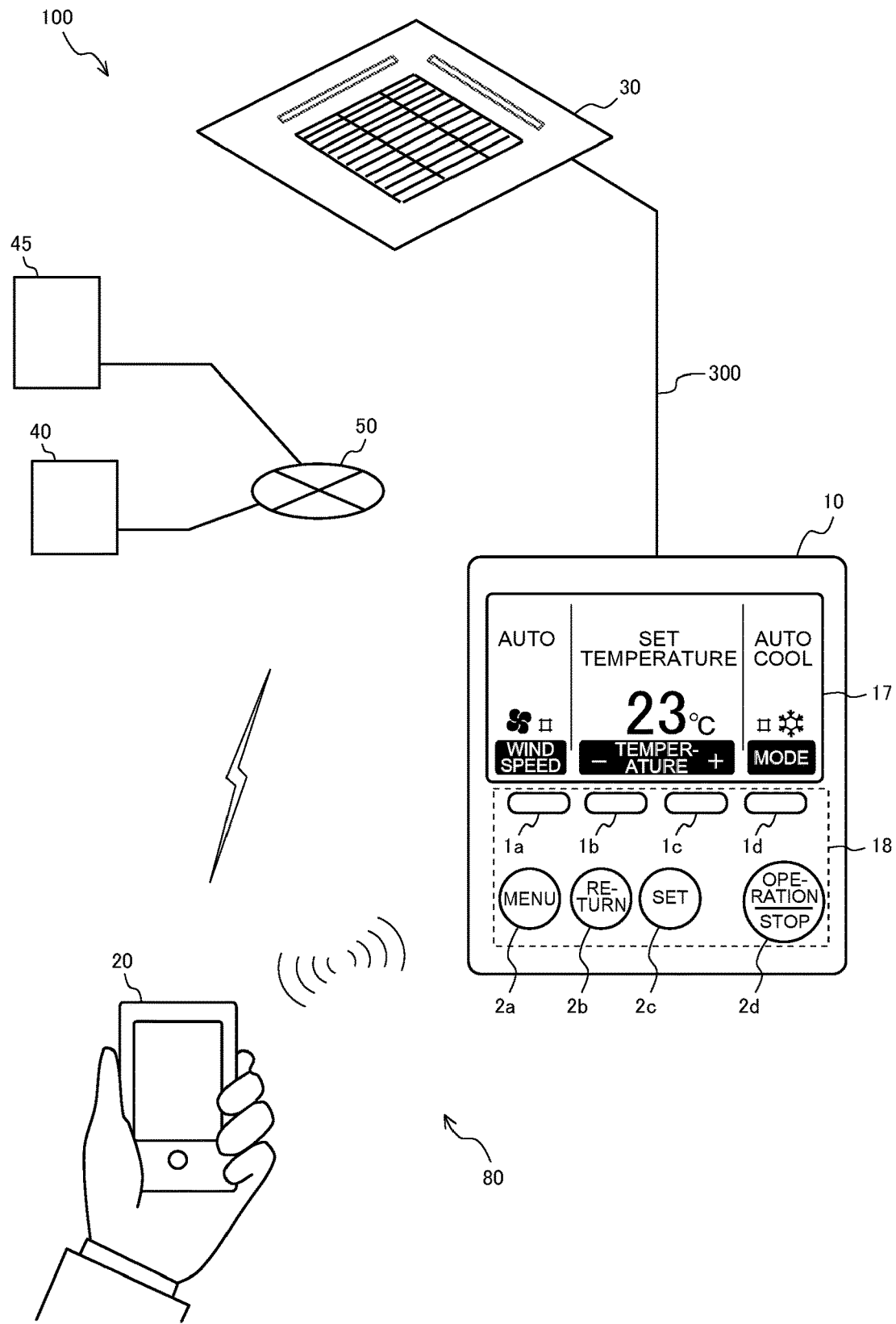
FIG. 13 is a schematic diagram showing the configuration of an apparatus management system according to Embodiment 2 of the present invention.

FIG. 13 is a schematic diagram showing the configuration of the apparatus management system 100 according to Embodiment 2 of the present invention. As shown in FIG. 13, in Embodiment 2, an air-conditioning apparatus is illustrated as the apparatus 30, a remote control unit of the air-conditioning apparatus is illustrated as the management device 10, and a smartphone is illustrated as the mobile terminal 20. The same reference signs denote components equivalent to those of Embodiment 1, and the description of the components is omitted. The apparatus management system of Embodiment 2 corresponds to the air-conditioning system of the present invention.

The apparatus 30 is provided in air-conditioning space, such as a room. The apparatus 30 adjusts the temperature, humidity, cleanliness, and other statuses of air in the air-conditioning space. The apparatus 30 may be a separate air conditioner whose indoor unit and outdoor unit are separately provided or may be an integrated air conditioner of which the function of an indoor unit and the function of an outdoor unit are combined with each other. The apparatus 30 may be a ventilator that interchanges air in the air-conditioning space with outside air, an air cleaner that removes dust or other particles floating in air, a humidifier that humidifies air in the air-conditioning space, or other apparatuses. For example, when the apparatus 30 includes an indoor unit and an outdoor unit, the management device 10 is connected to the indoor unit that conditions air in a room or another location.

The apparatus 30 and the management device 10 are connected by a transmission line 300. The management device 10 is provided on a wall surface of the room or another location that is the air-conditioning space. The operation control unit 13 monitors the apparatus 30 by acquiring detected values of various sensors (not shown) provided in the apparatus 30, and controls the operation of the apparatus 30. The display unit 17 displays information about an operation made to the air-conditioning apparatus, information about the operational status of the apparatus 30, information representing the status of air in the air-conditioning space, and other information. That is, the display control unit 15 causes the display unit 17 to display various pieces of information on the basis of, for example, details of an input operation made by a user and details of communication with the mobile terminal 20.

The management device 10 includes, for example, a plurality of functional keys 1a to 1d and a plurality of fixed keys 2a to 2d as the input unit 18. Various functions are allocated to the functional keys 1a to 1d for a page displayed on the display unit 17. Specific functions are fixedly allocated to the fixed keys 2a to 2d. As shown in FIG. 13, when the display unit 17 displays information about wind speed, information about set temperature, and information about operation mode, the functional key 1a accepts a change in a set wind speed, the functional key 1b and the functional key 1c accept a change in a set temperature, and the functional key 1d accepts a change in an operation mode. As the fixed key 2a labeled "MENU" is depressed by a user, the display control unit 15 causes the display unit 17 to display a menu page. As the fixed key 2b labeled "RETURN" is depressed by a user, the display control unit 115 causes the display unit 17 to display a previous page. As a user performs an input operation with the use of the plurality of functional keys 1a to 1d and other keys and depresses the fixed key 2c labeled "SET", the operation control unit 13 updates the settings on the apparatus 30 in accordance with the details input by the user. As the fixed key 2d labeled "OPERATION/STOP" is depressed by a user, the operation control unit 13 stops or starts the operation of the apparatus 30.

Although FIG. 13 illustrates the case where the management device 10 communicates with the apparatus 30 by wired connection, the mode of connection is not limited to the one as described. Of course, the management device 10 may be configured to communicate with the apparatus 30 by any communication standards, such as wireless LAN, infrared communication, and Bluetooth. The display unit 17 may be a touch panel or another device. The touch panel includes a display panel and a detection unit. The display panel displays, for example, text or an image. The detection unit is laminated with the display panel, and detects a touch operation.

As described above, when the distance between the management device 10 and the mobile terminal 20 is shorter than the threshold, the management device 10 switches the display settings of the display unit 17 to the display settings of the mobile terminal 20. Consequently, the management device 10 is able to automatically adapt the display settings of the display unit 17 to the preference of a user. Hence, the management device 10 is able to easily and quickly perform a process of switching the display settings of the management device 10 into various display settings. The other advantageous effects are similar to those of Embodiment 1.

Embodiment 3

The configuration of an apparatus management system of Embodiment 3 is similar to that of Embodiment 1, so the same reference signs denote components equivalent to those of Embodiment 1, and the description of the components is omitted. The information generating program of Embodiment 3 contains an operation application that provides the mobile terminal 20 with the function of a remote control unit for operating the apparatus 30. In the display switch system 80 of Embodiment 3, the apparatus 30 that is operable by the management device 10 can be operated by the mobile terminal 20 in which the information generating program containing the operation application for operating the apparatus 30 is installed. For example, when the apparatus 30 is an air-conditioning apparatus, an operation application dedicated to the air-conditioning apparatus needs to be installed in the mobile terminal 20 to operate the air-conditioning apparatus with the mobile terminal 20.

As the information generating program is activated in the mobile terminal 20 and the mobile terminal 20 executes a connection process with the management device 10, the mobile terminal 20 transmits the display setting information of the mobile terminal 20 to the management device 10 under the information generating program. Then, in the management device 10, through a translation process and other processes, the display settings of the display unit 17 switch to the display settings of the mobile terminal 20. The connection process that the mobile terminal 20 executes with the management device 10 includes, for example, BLE pairing. As the information generating program of the mobile terminal 20 is exited, the display setting of the management device 10 switch to the default display settings even when the intensity of the wireless signal is greater than the first threshold. The above details are similar to those in the case of Embodiment 1.

That is, the information generating program is concerned with all the processes such as the display switching process and setting change process of the management device 10. Consequently, the following description will be made of the case where the information generating program containing the operation application for operating the apparatus 30 is installed in the mobile terminal 20.

After the display switch system 80 of Embodiment 3 adjusts the display settings of the display unit 17 of the management device 10 to the display settings of the mobile terminal 20, when an operation is performed at the management device 10, the display screen of the mobile terminal 20 is changed into the details of the operation. That is, when the management device 10 is operated by a user, the management device 10 transmits operation information representing the details of the operation to the mobile terminal 20. The mobile terminal 20 adjusts the status of display on the terminal display unit 21a to the status of display on the display unit 17 on the basis of the operation information received from the management device 10.

The management device 10 accepts an operation to change the settings of operation items through the input unit 18. For example, when the apparatus 30 is an air-conditioning apparatus, it is conceivable that the operation items include a set temperature or other items in addition to operation modes including cooing mode, heating mode, and other modes. In this case, when an operation to switch between the cooling mode and the heating mode or an operation to change the set temperature is performed at the management device 10, the management device 10 transmits operation information representing the changed operation mode, the changed set temperature, or other information to the mobile terminal 20. The mobile terminal 20 adjusts the status of display on the terminal display unit 21a to the status of display on the management device 10 in accordance with the operation information received from the management device 10 under the operation application for operating the apparatus 30. The remaining configuration of the management device 10 and mobile terminal 20 is similar to that of Embodiment 1.

Figure 14:
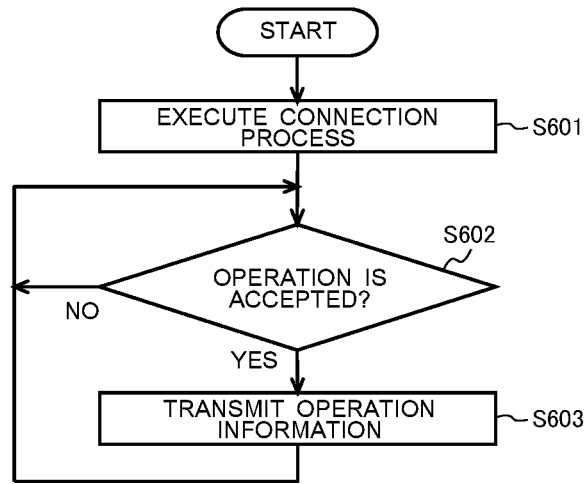
FIG. 14 is a flowchart showing the operation of the management device according to Embodiment 3 of the present invention.

FIG. 14 is a flowchart showing the operation of the management device according to Embodiment 3 of the present invention. The communication control unit 14 of the management device 10 executes the operation as in the case of Embodiment 1 when the management device 10 detects one or a plurality of the mobile terminals 20. The display control unit 15 of the management device 10 executes the operation as in the case of Embodiment 1 when the management device 10 detects one or a plurality of the mobile terminals 20. Although not described in Embodiment 1, the management device 10 and the mobile terminal 20 need to execute a connection process by mutual authentication to establish data communication between the management device 10 and the mobile terminal 20. Hereinafter, description will be made of the case where the connection process is executed when the radio field intensity of the mobile terminal 20 is greater than or equal to the first threshold.

When the intensity determination unit 14b determines that the radio field intensity of the mobile terminal 20 is greater than or equal to the first threshold, the wireless communication unit 11 executes the connection process with the terminal wireless communication unit 22 of the mobile terminal 20. Thus, a connected state where the management device 10 and the mobile terminal 20 are able to establish wireless communication with each other is established. As in the case of Embodiment 1, the management device 10 adjusts the display settings of the display unit 17 to the display settings of the mobile terminal 20 (step S601).

The display control unit 15 keeps the status of display on the display unit 17 until a user performs an operation through the input unit 18 (NO in step S602). As the display control unit 15 receives an operation to change the status of display on the display unit 17 through the input unit 18 (YES in step S602), the display control unit 15 transmits operation information representing the details of the received operation to the mobile terminal 20 (step S603).

Figure 15:
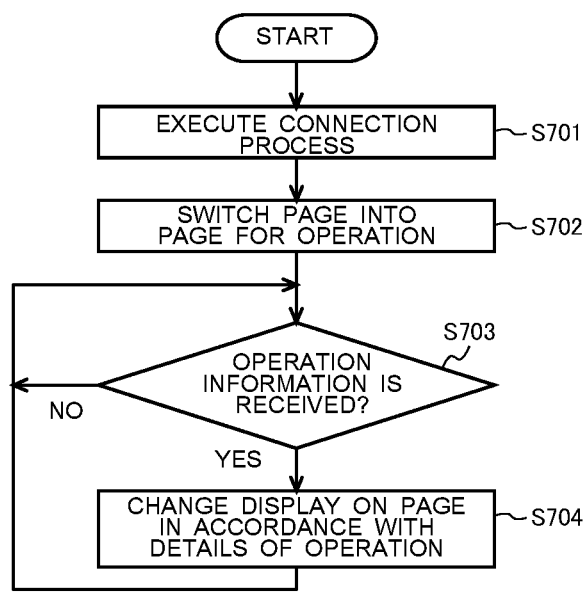
FIG. 15 is a flowchart showing the operation of the mobile terminal according to Embodiment 3 of the present invention.

FIG. 15 is a flowchart showing the operation of the mobile terminal according to Embodiment 3 of the present invention. A process in which the mobile terminal 20 causes the status of display on the terminal display unit 21a to follow a change in the status of display on the management device 10 will be described with reference to FIG. 15.

First, the terminal wireless communication unit 22 executes the connection process with the wireless communication unit 11 of the management device 10 at the timing of step S601 (step S701). The terminal display processing unit 23c switches the page on the terminal display unit 21a to the page for operating the apparatus 30 through the operation application for operating the apparatus 30 (step S702).

The terminal display processing unit 23c keeps the status of display on the terminal display unit 21a until the operation information is transmitted from the management device 10 (NO in step S703). As the operation information is transmitted from the management device 10 to the terminal display processing unit 23c (YES in step S703), the terminal display processing unit 23c changes the status of display on the terminal display unit 21a into the details of the operation of the user at the management device 10 on the basis of the operation information (step S704).

As described above, as in the case of Embodiments 1 and 2, the management device 10 of Embodiment 3 is also able to automatically adapt the display settings of the display unit 17 to the preference of a user. Consequently, the management device 10 is able to easily and quickly perform a process of switching the display settings of the management device 10 into various display settings. The mobile terminal 20 of Embodiment 3 is able to be used as a remote control unit for operating the apparatus 30. That is, once the connection process is executed, a user is allowed to manage the apparatus 30 by operating the mobile terminal 20. That is, the user is allowed to manage the apparatus 30 by operating the mobile terminal 20 that is carried by the user at a desired location without being aware of the management device 10, so usability is improved.

Furthermore, the mobile terminal 20 includes the terminal display unit 21a and the terminal control unit 23. The terminal display unit 21a displays a page for operating the apparatus. The terminal control unit 23 controls the status of display on the terminal display unit 21a. When the status of display on the display unit 17 of the management device 10 is changed, the terminal control unit 23 changes the status of display on the terminal display unit 21a into the changed status of display on the display unit 17. Consequently, the user is allowed to check the current settings of the management device 10 by visually checking the mobile terminal 20 without checking the management device 10, so convenience is improved. The configuration of each of Modifications 1-1 to 7 of Embodiment 1 may also be applied to the configuration of Embodiment 3, and similar advantageous effects are obtained. The display switch system 80 of Embodiment 3 may be employed as the component of the apparatus management system 100 of Embodiment 2.

Embodiment 4

The configuration of an apparatus management system of Embodiment 4 is similar to those of Embodiments 1 and 3, so the same reference signs denote components equivalent to those of Embodiments 1 and 3, and the description of the components is omitted.

In Embodiment 3, the case where the information generating program contains the operation application for operating the specific apparatus 30 is illustrated. The information generating program of Embodiment 4 contains an operation application that supports an operation over various apparatuses 30. In the following description, description will be made of the case where the information generating program containing the operation application for operating the apparatus 30 is installed in the mobile terminal 20.

For example, an air-conditioning apparatus made up of an outdoor unit and an indoor unit is conceivable as the apparatus 30 that the management device 10 manages. There are various models of air-conditioning apparatuses, and types of operation items that are displayed on an operation screen can vary among the models.

For this reason, an item table is stored in the storage unit 16 of Embodiment 4. The item table associates model information of each of a plurality of the apparatuses 30 with item data that represents operation items for the model information. The model information of the apparatus 30 to be managed is previously stored in the storage unit 16. The control unit 12 acquires item data for model information through collating the model information with the item table, and transmits the acquired item data to the mobile terminal 20. The terminal control unit 23 of the mobile terminal 20 causes the terminal display unit 21a to display the page for operating the apparatus 30 in accordance with the item data transmitted from the management device 10.

Figure 16:
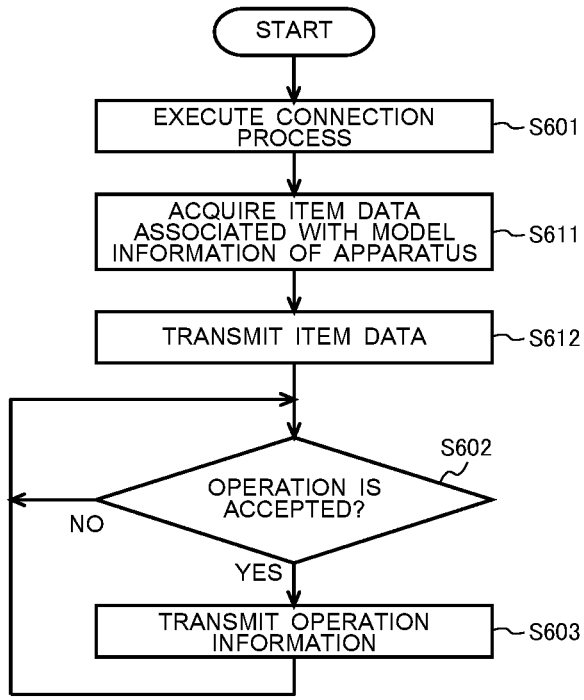
FIG. 16 is a flowchart showing the operation of the management device according to Embodiment 4 of the present invention.

FIG. 16 is a flowchart showing the operation of the management device according to Embodiment 4 of the present invention. The details of process that is executed by the management device 10 will be described with reference to FIG. 16 as in the similar case to that of Embodiment 3. The same reference signs denote steps similar to those of FIG. 14, and the description of the steps is omitted.

The management device 10 executes the operation of step S601 as in the case of FIG. 14. Subsequently, the control unit 12 acquires item data for model information of the apparatus 30 to be operated through collating the model information with the item table (step S611). The control unit 12 transmits the acquired item data to the mobile terminal 20 (step S612). Subsequently, the management device 10 executes the process of step S602 and step S603 as in the case of FIG. 14.

Figure 17:
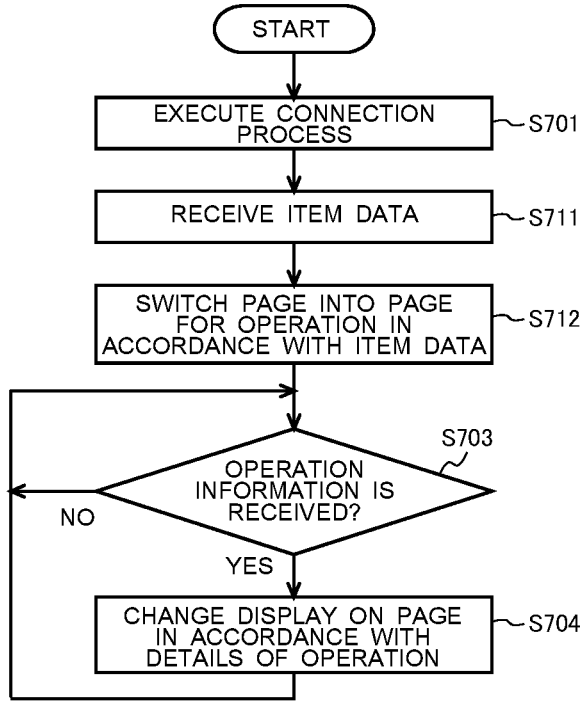
FIG. 17 is a flowchart showing the operation of the mobile terminal according to Embodiment 4 of the present invention.

FIG. 17 is a flowchart showing the operation of the mobile terminal according to Embodiment 4 of the present invention. A process in which the mobile terminal 20 causes the status of display on the terminal display unit 21a to follow a change in the status of display on the management device 10 will be described with reference to FIG. 17. The same reference signs denote steps similar to those of FIG. 15, and the description of the steps is omitted.

First, the terminal wireless communication unit 22 executes the operation of step S701 as in the case of FIG. 15. Subsequently, the terminal control unit 23 receives item data from the management device 10 (step S711). The terminal control unit 23 switches the page on the terminal display unit 21a to the page for operating the apparatus 30 in accordance with the item data (step S712). Subsequently, the mobile terminal 20 executes the process of step S703 and step S704 as in the case of FIG. 15.

In the above description, the case where the item table is stored in the management device 10 is illustrated; however, the location where the item table is stored is not limited to the management device 10. The item table may be stored in the mobile terminal 20. That is, the item table may be stored in the terminal storage unit 23a of the mobile terminal 20. In this case, the management device 10 preferably transmits model information of the apparatus 30 to be managed to the mobile terminal 20. The terminal control unit 23 of the mobile terminal 20 preferably acquires item data for model information transmitted from the management device 10 through collating the model information with the item table. The terminal control unit 23 preferably causes the terminal display unit 21a to display the page for operating the apparatus 30 on the basis of the acquired item data.

Figure 18:
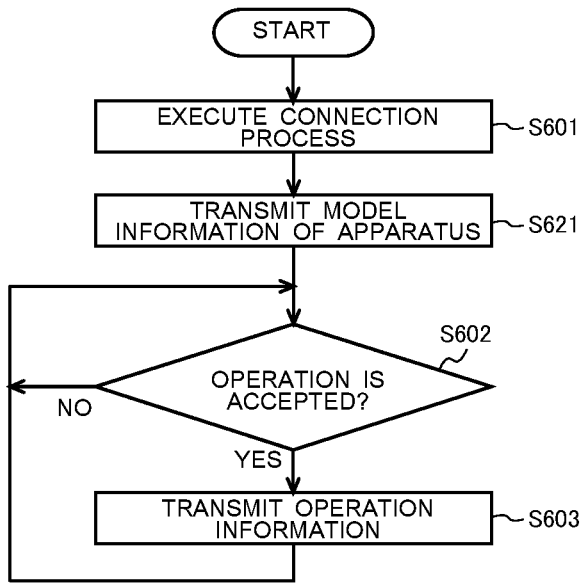
FIG. 18 is a flowchart showing another operation of the management device according to Embodiment 4 of the present invention.
Figure 19:
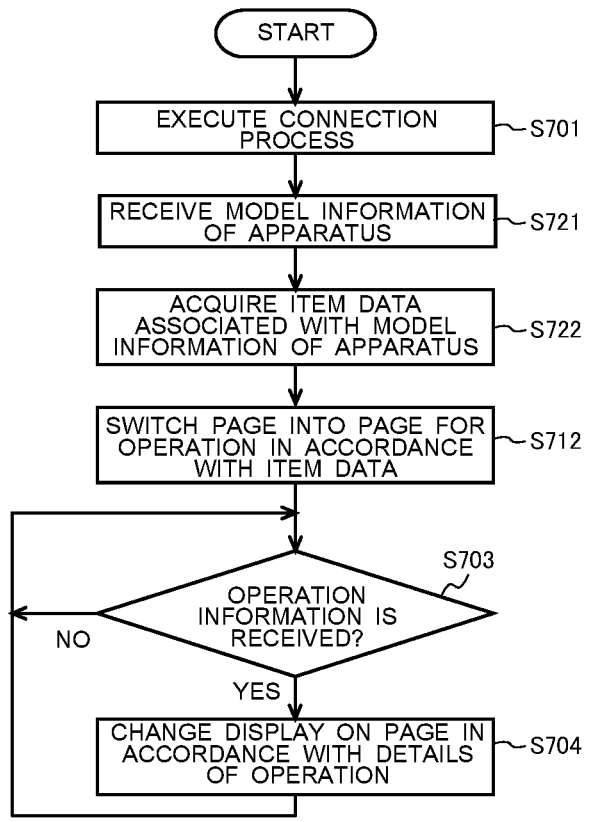
FIG. 19 is a flowchart showing another operation of the mobile terminal according to Embodiment 4 of the present invention.

FIG. 18 is a flowchart showing another operation of the management device according to Embodiment 4 of the present invention. FIG. 19 is a flowchart showing another operation of the mobile terminal according to Embodiment 4 of the present invention. The details of process that is executed by an alternative configuration to the above-described configuration will be described with reference to FIG. 18 and FIG. 19. The same reference signs denote steps similar to those of FIG. 16 and FIG. 17, and the description of the steps is omitted.

As shown in FIG. 18, the management device 10 executes the operation of step S601 as in the case of FIG. 14. Subsequently, the control unit 12 transmits model information of the apparatus 30 to be operated to the mobile terminal 20 (step S621). Subsequently, the management device 10 executes the process of step S602 and step S603 as in the case of FIG. 14.

As shown in FIG. 19, the terminal wireless communication unit 22 executes the operation of step S701 as in the case of FIG. 15. Subsequently, the terminal control unit 23 receives the model information from the management device 10 (step S721). Subsequently, the terminal control unit 23 acquires item data for the model information received from the management device 10 through collating the model information with the item table (step S722). The terminal control unit 23 switches the page on the terminal display unit 21a to the page for operating the apparatus 30 in accordance with the item data (step S712). Subsequently, the mobile terminal 20 executes the process of step S703 and step S704 as in the case of FIG. 15.

As described above, as in the case of Embodiments 1 to 3, the management device 10 of Embodiment 4 is also able to automatically adapt the display settings of the display unit 17 to the preference of a user. Consequently, the management device 10 is able to easily and quickly perform a process of switching the display settings of the management device 10 into various display settings.

Various models are conceivable as the apparatus 30 of Embodiment 4, and operable items vary among the models. For example, for an air-conditioning apparatus, operable items can vary depending on the models of the outdoor unit and indoor unit. In this respect, for the display switch system 80 of Embodiment 4, the page for operating, which is displayed on the mobile terminal 20, switches for model information to be in the status of display for various models. Consequently, the mobile terminal 20 is allowed to be used as a remote control unit for operating any kinds of apparatuses 30. The other advantageous effects are similar to those of Embodiment 3. The configuration of each of Modifications 1-1 to 7 of Embodiment 1 may also be applied to the configuration of Embodiment 4, and similar advantageous effects are obtained. The display switch system 80 of Embodiment 4 may be employed as the component of the apparatus management system 100 of Embodiment 2.

Embodiments 1 to 4 are preferred specific examples of the management device, display switch system, and apparatus management system. The technical scope of the present invention is not limited to these modes. For example, in Embodiments 1 to 4, the case where the first threshold and the second threshold are different from each other is illustrated; however, the first and second thresholds are not limited to the ones as described. The first threshold and the second threshold may be set to the same value. However, as described above, when the intensity determination unit 14b is configured to use the first threshold and the second threshold, hunting that is a repeated transmission of a switching command and a restoration command due to a temporary decrease in radio field intensity is reduced, so control is stabilized.

In Embodiments 1 to 4, the case where the detection unit 11a detects a radio wave that is transmitted by the mobile terminal 20 as a wireless signal is illustrated; however, an object that the detection unit 11a detects is not limited to the radio wave. For example, the detection unit 11a may detect light or supersonic wave as a wireless signal that is transmitted by the mobile terminal 20. That is, the wireless communication unit 11 may be configured to wirelessly communicate with the mobile terminal 20 through light or supersonic wave.

Furthermore, the management devices 10 and 110 are not limited to the configuration that the distance between the mobile terminal 20 and the management devices 10 and 110 is acquired by using the intensity of a wireless signal detected by the detection unit 11a. The management devices 10 and 110 may include, for example, a distance sensor or other sensors. In this case, the management devices 10 and 110 may sense the proximity of the mobile terminal 20 by using a detected result of the distance sensor or other sensors. That is, the management devices 10 and 110 are only required to have a function of determining whether the distance between the mobile terminal 20 and the management devices 10 and 110 is shorter than the threshold by using a wireless signal detected by the wireless communication unit 11, a detected result of the distance sensor, or other information. The distance sensor may be, for example, an optical sensor that uses an LED, a laser diode, or another device, or may be a sensor of another detection type other than an optical type, such as supersonic type. When the control unit 12 determines the distance between the mobile terminal 20 and the management devices 10 and 110 by using the intensity of a wireless signal, no distance sensor or other sensors need to be provided, so simplification of the configuration and cost reduction are achieved.

For example, when the management device 10 is provided in a room of a hotel, the management device 10 may be activated by a room key of the room in such a manner that the management device 10 is interconnected with the room key. That is, the wireless communication unit 11 may start detecting a radio wave when the room key of the room is unlocked and may stop detecting a radio wave when a person who stays in the room goes out from the room. In this case, when the management device 10 completes the process of switching the display settings, the management device 10 preferably turns off the communication function of the wireless communication unit 11, for example, until a person who stays in the room goes out or until a person who stays in the room checks out from the hotel. With this configuration, no detection of a radio wave is required until a person who stays in the room goes out or until a person who stays in the room checks out from the hotel, so communication cost is reduced.

When the mobile terminal 20 is closer to the management device 10 or the management device 110, the management device 10 may cause an authentication page that prompts input of a PIN code to be displayed and, when a correct PIN code is input, switch the display settings of the management device 10 to the display settings of the mobile terminal 20.

Furthermore, the apparatus management system in each of Embodiments 1 to 4 may include a plurality of the apparatuses 30 and the management devices 10 associated with the respective apparatuses 30. The plurality of management devices 10 may include the management device 10 that serves as a master device and the management device 10 that serves as a slave device. The management device 10 that serves as a slave device may establish data communication with the external server 45 via the management device 10 that serves as a master device.

The communication control unit 14 may have a function of sensing that the mobile terminal 20 moves away from the management device 10 or the management device 110 on the basis of a wireless signal detected by the wireless communication unit 11. The communication control unit 14 may restore the display settings of the display unit 17 to the default display settings when the distance between the mobile terminal 20 and the management device 10 or 110 shorter than the threshold becomes longer than or equal to a certain distance.

FIG. 2 illustrates the case where the mobile terminal 20 includes the display and input unit 21 made up of a touch panel; however, the configuration is not limited to the one as described. For example, the mobile terminal 20 may include a display unit made up of, for example, a liquid crystal display panel and an input unit that includes, for example, a plurality of physical buttons and that accepts an input operation made by a user, instead of the display and input unit 21.

FIG. 3 and FIG. 8 illustrate the case where the display unit 17 and the input unit 18 are separately provided; however, the configuration of the display unit 17 and the input unit 18 are not limited to the one as described. The management devices 10 and 110 may include a touch panel having both the function of the display unit 17 and the function of the input unit 18. The display unit 17, as well as the display and input unit 21 of the mobile terminal 20, may be a touch panel including a display panel and a detection unit. The display panel displays, for example, text or an image. The detection unit is laminated with the display panel, and detects a touch operation.

In Embodiments 1 to 4, the case where the management device 10 is a remote control unit of the apparatus 30 is illustrated; however, the management device 10 is not limited to the one as described. For example, the management device 10 may be, for example, a device that at least includes a display unit such as a liquid crystal display panel. Examples of the device include a desktop PC, a notebook PC, a tablet PC, a PDA, a digital television, a DVD recorder, a stereo, and a car navigation system. For example, when the management device 10 is a PC provided at a location where many people use, such as a hotel, a multi-national corporation, and a manga cafe, the display settings of the PC switch depending on the display settings of the mobile terminal 20. Consequently, a user is allowed to use a PC as the management device 10 with no stress without performing a complicated operation.

The invention claimed is:

1. A management device that is connected to an apparatus, the management device being configured to manage the apparatus, the management device comprising:
a display unit configured to display information about the apparatus;
a wireless communication unit configured to wirelessly communicate with a mobile terminal; and
a control unit configured to, when a distance between the management device and the mobile terminal is shorter than a threshold, acquire display setting information representing display settings of the mobile terminal from the mobile terminal and switch display settings of the display unit to the display settings of the mobile terminal in accordance with the acquired display setting information,
the control unit being configured to, when a language setting represented by the display setting information is different from a default language setting, cause the display unit to display text information of translation data generated by translating text information in accordance with the language setting represented by the display setting information.

2. The management device of claim 1, wherein the display setting information is information that represents at least one of a language setting and a text size setting.

3. The management device of claim 2, wherein
the wireless communication unit includes a detection unit configured to detect a wireless signal transmitted by the mobile terminal, and
the control unit is configured to determine a distance between the management device and the mobile terminal by using an intensity of the wireless signal detected by the detection unit.

4. The management device of claim 3, wherein the control unit is configured to, when the detection unit detects wireless signals transmitted by the respective mobile terminals, compare intensities of the wireless signals transmitted by the respective mobile terminals, and adjust the display settings of the display unit to the display settings of the mobile terminal that transmits the wireless signal whose intensity is greatest.

5. The management device of claim 3, wherein
an information generating program is installed in the mobile terminal, the information generating program causing the mobile terminal to execute a process of generating the display setting information,
the information generating programs include an information generating program having a different priority, and
the control unit is configured to, when distances between the management device and a plurality of the mobile terminals are each shorter than the threshold, adjust the display settings of the display unit to the display settings of the mobile terminal in which the information generating program having a highest priority is installed.

6. The management device of claim 5, wherein the control unit is configured to, when distances between the management device and a plurality of the mobile terminals each in which the information generating program having the highest priority is installed are each shorter than the threshold, adjust the display settings of the display unit to the display settings of the mobile terminal that transmits the wireless signal whose intensity is greatest among the plurality of the mobile terminals each in which the information generating program having the highest priority is installed.

7. The management device of claim 1, wherein the control unit is configured to, when distances between the management device and a plurality of the mobile terminals are each shorter than the threshold, cause each of the plurality of the mobile terminals to display a priority button to accept preferential selection of the display settings and fix the display settings of the display unit to the display settings of the mobile terminal whose priority button is selected.

8. The management device of claim 3, wherein the control unit is configured to, when the intensity of the wireless signal transmitted by the mobile terminal is greater than a first threshold corresponding to the threshold, adjust the display settings of the display unit to the display settings of the mobile terminal.

9. The management device of claim 8, wherein the control unit is configured to, after the control unit adjusts the display settings of the display unit to the display settings of the mobile terminal, when the intensity of the wireless signal transmitted by the mobile terminal is less than a second threshold set to be less than the first threshold, switch the display settings of the display unit to default display settings.

10. The management device of claim 8, wherein
the control unit is configured to,
after the control unit adjusts the display settings of the display unit to the display settings of the mobile terminal, cause the display unit to display an image for setting keep mode to keep the display settings of the display unit, and
when the image for setting the keep mode is selected, keep the display settings of the display unit until a cancellation condition is satisfied.

11. The management device of claim 1, wherein the control unit is configured to, when a language setting represented by the display setting information is different from a default language setting, transmit text information to be displayed on the display unit to an external server configured to generate the translation data by translating the text information, and cause the display unit to display text information of the translation data returned from the external server.

12. The management device of claim 1, wherein the control unit is configured to, when a language setting represented by the display setting information is different from a default language setting, transmit text information to be displayed on the display unit to a mobile terminal having a function of generating translation the translation data by translating the text information, and cause the display unit to display text information of the translation data returned from the mobile terminal.

13. The management device of claim 11, further comprising a storage unit configured to store a translation database for translating a default language into at least one other language, wherein
the control unit is configured to,
when the translation database supports a language represented by the display setting information, generate the translation data by translating text to be displayed on the display unit by using the translation database, and
when the translation database does not support the language represented by the display setting information, transmit text information to be displayed on the display unit to the external server, and cause the external server to generate the translation data.

14. The management device of claim 11, wherein the control unit is configured to compare a count of characters with a character count threshold for each of terms included in the translation data, and cause the display unit to display an abbreviated term of the term whose count of characters is greater than the character count threshold.

15. The management device of claim 1, wherein the control unit is configured to, of the display settings of the display unit, adjust only display settings of a page being currently displayed to the display settings of the mobile terminal.

16. The management device of claim 1, further comprising
an input unit configured to accept an input operation from an outside, and transmit an operation signal based on details of the input operation to the control unit, wherein
the control unit is configuration to change a status of display on the display unit in response to the operation signal received from the input unit.

17. A display switch system, comprising:
the management device of claim 1; and
a mobile terminal including a terminal display unit and a terminal control unit, the terminal display unit being configured to display a page for operating the apparatus, the terminal control unit being configured to control a status of display on the terminal display unit, wherein
the terminal control unit is configured to, when a status of display on the display unit of the management device is changed, change a status of display on the terminal display unit into the changed status of display on the display unit.

18. The display switch system of claim 17, wherein
the control unit is configured to acquire item data associated with model information of the apparatus through collating the model information with an item table that associates the model information with the item data representing an operation item associated with the model information, and
the terminal control unit is configured to switch a page on the terminal display unit to a page for operating the apparatus in accordance with the item data acquired by the control unit.

19. The display switch system of claim 17, wherein the terminal control unit is configured to acquire item data associated with model information of the apparatus through collating the model information with an item table that associates the model information with the item data representing an operation item associated with the model information, and switch a page on the terminal display unit to a page for operating the apparatus in accordance with the acquired item data.

* * * * *